(12) United States Patent
Kim et al.

(10) Patent No.: US 9,860,460 B2
(45) Date of Patent: Jan. 2, 2018

(54) IMAGE SENSORS, IMAGE ACQUISITION DEVICES AND ELECTRONIC DEVICES UTILIZING OVERLAPPING SHUTTER OPERATIONS

(71) Applicant: Samsung Electronics Co., Ltd., Suwon-si, Gyeonggi-do (KR)

(72) Inventors: Moo-Young Kim, Suwon-si (KR); Kwang-Hyun Lee, Seongnam-si (KR); Woong Joo, Seoul (KR); Kyoung-Min Koh, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 40 days.

(21) Appl. No.: 15/049,968

(22) Filed: Feb. 22, 2016

(65) Prior Publication Data
US 2016/0373667 A1  Dec. 22, 2016

(30) Foreign Application Priority Data
Jun. 22, 2015 (KR) .................. 10-2015-0088645

(51) Int. Cl.
*H04N 5/353* (2011.01)
*H04N 5/378* (2011.01)
*H04N 5/374* (2011.01)
*H04N 5/3745* (2011.01)

(52) U.S. Cl.
CPC ......... *H04N 5/3532* (2013.01); *H04N 5/378* (2013.01); *H04N 5/3741* (2013.01); *H04N 5/3745* (2013.01)

(58) Field of Classification Search
CPC .................... H04N 5/3532; H04N 5/3741
See application file for complete search history.

(56) References Cited

U.S. PATENT DOCUMENTS

| | | | |
|---|---|---|---|
| 7,084,914 B2 | 8/2006 | Van Blerkom | |
| 7,528,873 B2 | 5/2009 | Van Blerkom | |
| 7,742,062 B2 * | 6/2010 | Oisel | G06K 9/209 345/619 |

(Continued)

FOREIGN PATENT DOCUMENTS

| | | |
|---|---|---|
| JP | 2002-077522 | 3/2002 |
| JP | 2007-325026 | 12/2007 |

(Continued)

*Primary Examiner* — Roberto Velez
*Assistant Examiner* — Cynthia Segura
(74) *Attorney, Agent, or Firm* — Myers Bigel, P.A.

(57) ABSTRACT

An image sensor can include a pixel array including a plurality of unit pixels and a row driver arranged in a matrix form that includes a plurality of rows and a plurality of columns. Respective ones of the unit pixels may convent an incident light to an electric signal and may store the electric signal. The row driver may sequentially scan the plurality of rows and may sequentially perform an electronic shutter operation and read-out operation. The electronic shutter operation may reset the stored electric signal in each unit pixel and the read-out operation may read-out the stored electric signal in each unit pixel. The electric shutter operation can include a preliminary shutter operation and a main shutter operation which are sequentially performed on one row. The row driver may overlap the main shutter operation on a first row and the preliminary shutter operation on a second row.

20 Claims, 14 Drawing Sheets

(56) References Cited

U.S. PATENT DOCUMENTS

| | | |
|---|---|---|
| 8,179,459 B2 | 5/2012 | Koizumi |
| 8,203,634 B2 | 6/2012 | Mabuchi |
| 8,797,434 B2 | 8/2014 | Lee et al. |
| 9,001,244 B2 * | 4/2015 | Makino ................ H04N 5/3454 348/294 |
| 9,628,729 B2 * | 4/2017 | Makino ................ H04N 5/3591 |
| 2008/0158402 A1 * | 7/2008 | Okano ................... H04N 5/343 348/308 |
| 2008/0284884 A1 * | 11/2008 | Makino ................ H04N 5/3454 348/296 |
| 2011/0102623 A1 * | 5/2011 | Ebihara ................. H04N 5/343 348/222.1 |
| 2013/0100327 A1 | 4/2013 | Senda et al. |
| 2013/0208162 A1 * | 8/2013 | Masagaki ............ H04N 5/3597 348/308 |
| 2014/0367552 A1 * | 12/2014 | Hynecek ........... H01L 27/14614 250/208.1 |
| 2016/0142653 A1 * | 5/2016 | Cho ....................... H04N 5/353 348/296 |

FOREIGN PATENT DOCUMENTS

| | | |
|---|---|---|
| JP | 2009-017218 | 1/2009 |
| JP | 2013-243783 | 12/2013 |
| JP | 2014-216978 | 11/2014 |

\* cited by examiner

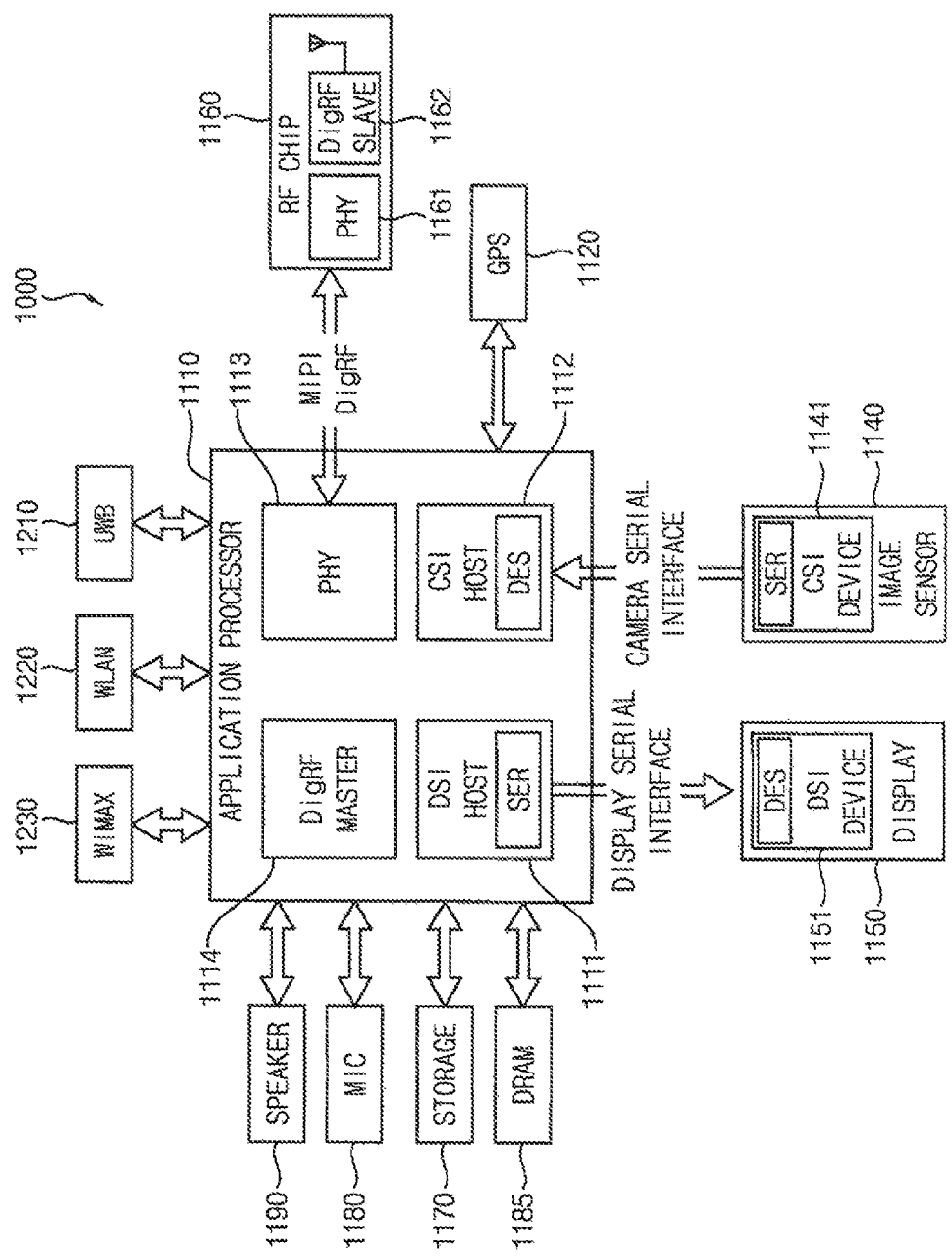

IMAGE SENSORS, IMAGE ACQUISITION DEVICES AND ELECTRONIC DEVICES UTILIZING OVERLAPPING SHUTTER OPERATIONS

CROSS-REFERENCE TO RELATED APPLICATION

This application claims priority under 35 USC §119 to Korean Patent Application No. 10-2015-0088645, filed on Jun. 22, 2015, in the Korean Intellectual Property Office (KIPO), the entire contents of which are incorporated herein by reference.

BACKGROUND

1. Technical Field

Example embodiments relate to image sensors, and more particularly to image sensors that perform an electronic shutter operation, image acquisition devices including the same and electronic devices including the same.

2. Description of the Related Art

An image sensor is a semiconductor device that converts a photo image, for example, light reflected by a subject, into an electric signal. Thus, image sensors are widely used in portable electronic devices, such as digital cameras, cellular phones, and the like. Generally, image sensors can be classified into charged coupled device (CCD) image sensors and complementary metal oxide semiconductor (CMOS) image sensors. Recently, CMOS image sensors have received more attention compared to CCD image sensors due to advantages, such as low manufacturing costs, low power consumption, ease of integration with peripheral circuits, and the like. Furthermore, CMOS image sensors may be classified into rolling shutter CMOS image sensors and global shutter CMOS image sensors.

SUMMARY

Some example embodiments may provide an image sensor capable of enhancing performance.

Some example embodiments may provide an image acquisition device that includes the image senor, capable of enhancing performance.

Some example embodiments may provide an electronic device that includes the image senor, capable of enhancing performance.

According to some example embodiments, an image sensor may include a pixel array including a plurality of unit pixels and a row driver. The unit pixels may be arranged in a matrix form that includes a plurality of rows and a plurality of columns, and respective ones of the unit pixels may convert an incident light to an electric signal and may store the electric signal. The row driver may sequentially scan the plurality of rows and may sequentially perform an electronic shutter operation and read-out operation. The electronic shutter operation may reset the stored electric signal in each unit pixel and the read-out operation may read-out the stored electric signal in each unit pixel. The electric shutter operation may include a preliminary shutter operation and a main shutter operation which may be sequentially performed on one row. The row driver may overlap the main shutter operation on a first row of the plurality of rows and the preliminary shutter operation on a second row, different from the first row, of the plurality of rows.

In example embodiments, a unit time required for scanning the one row may correspond to 1 horizontal scanning (1H) time. The preliminary shutter operation on the one row may be performed within a first 1H time, and the main shutter operation on the one row may be performed within a second 1H time after the first 1H time.

Respective ones of the unit pixels may include a photo detector, a transfer transistor, a reset transistor, a sensing transistor and a selection transistor. The photo detector may convert the incident light to the electric signal, and the photo detector may have a first terminal coupled to a ground voltage. The transfer transistor may be coupled to a second terminal of the photo detector and a floating diffusion node. The reset transistor may be coupled between a power supply voltage and the floating diffusion node. The sensing transistor may be coupled to the power supply voltage, and the sensing transistor may have a gate coupled to the floating diffusion node. The selection transistor may be coupled to the sensing transistor and a corresponding column line. The row driver may apply a reset control signal to a gate of the reset transistor, a transfer control signal to a gate of the transfer transistor, and a selection control signal to a gate of the selection transistor, respectively.

The row driver may perform the preliminary shutter operation by applying the transfer control signal to the transfer transistor as a preliminary shutter pulse, and the transfer control signal may be activated within a preliminary shutter interval. The row driver may perform the main shutter operation by applying the transfer control signal to the transfer transistor as a main shutter pulse, and the transfer control signal may be activated within a main shutter interval. The row driver may perform the read-out operation by applying the transfer control signal to the transfer transistor as a read-out pulse, and the transfer control signal may be activated within a read-out interval.

The second 1H time may be consecutive to the first 1H time, and the read-out pulse may be activated within a third 1H time which is one 1H time interval behind from the second 1H time.

The row driver may activate the reset control signal during the preliminary shutter interval, deactivate the reset control signal during the main shutter interval and deactivate the reset control signal during the read-out interval.

The row driver may activate the selection control signal during the read-out interval.

The row driver may synchronize the main shutter operation on the first row and the preliminary shutter operation on the second row based on an address signal. The first row and the second row may have a difference by one row in a column direction.

The plurality of unit pixels may include first unit pixels and second unit pixels which are alternatively arranged in a column direction. Respective ones of the first unit pixels may include a first photo detector, a first transfer transistor. The first photo detector may convert the incident light to the electric signal, and the first photo detector may have a first terminal coupled to a ground voltage. The first transfer transistor may be coupled to a second terminal of the first photo detector and a floating diffusion node. Respective ones of the second unit pixels may include a second photo detector and a second transfer transistor. The second photo detector may convert the incident light to the electric signal, and the second photo detector may have a first terminal coupled to the ground voltage. The second transfer transistor may be coupled to a second terminal of the second photo detector and the floating diffusion node. The respective first unit pixels and the respective second unit pixels may commonly further include a reset transistor, a sensing transistor and a selection transistor.

The reset transistor may be coupled between a power supply voltage and the floating diffusion node. The sensing transistor may be coupled to the power supply voltage, and the sensing transistor may have a gate coupled to the floating diffusion node. The selection transistor may be coupled to the sensing transistor and a corresponding column.

The row driver may apply a reset control signal to a gate of the reset transistor, apply a selection control signal to a gate of the selection transistor, apply a first transfer control signal to a gate of the first transfer transistor and apply a second transfer control signal to a gate of the second transfer transistor, respectively.

The row driver may perform the preliminary shutter operation by applying the first transfer control signal to the first transfer transistor as a preliminary shutter pulse, and the first transfer control signal may be activated within a preliminary shutter interval. The row driver may perform the main shutter operation by applying the first transfer control signal to the first transfer transistor as a main shutter pulse, and the first transfer control signal may be activated within a main shutter interval. The row driver may perform the read out operation by applying the first transfer control signal to the first transfer transistor as a read-out pulse, and the first transfer control signal may be activated within a read-out interval.

The second 1H time may be one 1H time interval behind from the first 1H time. The row driver may synchronize the main shutter operation on the first row and the preliminary shutter operation on the second row based on an address signal. The first row and the second row may have a difference by two rows in a column direction.

The second 1H time may be consecutive to the first 1H time. The row driver may deactivate the reset control signal during an interval that the preliminary shutter pulse is applied and during an interval that the main shutter pulse is applied, respectively. The row driver may synchronize the main shutter operation on the first row and the preliminary shutter operation on the second row based on an address signal. The first row and the second row may have a difference by one row in a column direction.

In example embodiments, the row driver may perform the electronic shutter operation on the unit pixels on a row basis and the image sensor may be a rolling-shutter image sensor.

According to some example embodiments, an image acquisition device may include an image sensor having a pixel array, a receiving lens and a control engine. The receiving lens may focus incident light on the pixel array. The control engine may control the image sensor. The image sensor may include the pixel array having a plurality of unit pixels and a row driver. The unit pixels may be arranged in a matrix form that includes a plurality of rows and a plurality of columns, and respective ones of the unit pixels may convert the incident light to an electric signal and may store the electric signal. The row driver may sequentially scan the plurality of rows and may sequentially perform an electronic shutter operation and a read-out operation. The electronic shutter operation may reset the stored electric signal in each unit pixel and the read-out operation may read-out the stored electric signal in each unit pixel. The electric shutter operation may include a preliminary shutter operation and a main shutter operation which are sequentially performed on one row. The row driver may overlap the main shutter operation on a first row of the plurality of rows and the preliminary shutter operation on a second row, different from the first row, of the plurality of rows.

In example embodiments, the unit time required for scanning the one row may correspond to 1 horizontal scanning (1H) time. The preliminary shutter operation on the one row may be performed within a first 1H time, and the main shutter operation on the one row may be performed within a second 1H time after the first 1H time.

According to some example embodiments, an electronic device may include an image sensor, a storage device, and a processor. The image sensor may generate a digital signal corresponding to incident light. The storage device may store the digital signal. The processor may control operations of the image sensor and the storage device. The image sensor may include a pixel array including a plurality of unit pixels and a row driver. The unit pixels may be arranged in a matrix form that includes a plurality of rows and a plurality of columns, and respective ones of the unit pixels may convert the incident light to electric signal and may store the electric signal. The row driver may sequentially scan the plurality of rows and may sequentially perform an electronic shutter operation and a read-out operation. The electronic shutter operation may reset the stored electric signal in each unit pixel and the read-out operation may read-out the stored electric signal in each unit pixel. The electric shutter operation may include a preliminary shutter operation and a main shutter operation which are sequentially performed on one row. The row driver may synchronize the main shutter operation on a first row of the plurality of rows and the preliminary shutter operation on a second row, different from the first row, of the plurality of rows.

In example embodiments, the unit time required for scanning the one row may correspond to 1 horizontal scanning (H) time. The preliminary shutter operation on the one row may be performed within a first 1H time, and the main shutter operation on the one row may be performed within a second 1H time after the first 1H time.

The row driver may perform the preliminary shutter operation on the one row within the first 1H time and perform the main shutter operation on the one row within the second 1H time. The second 1H time may be consecutive to the first 1H time.

The row driver may perform the preliminary shutter operation on the one row within the first 1H time and perform the main shutter operation on the one row within the second 1H time. The second 1H time may be one 1H time interval behind from the first 1H time.

Accordingly, image sensors according to example embodiments may synchronize a main shutter operation on a first row of a pixel array with a preliminary shutter operation on a second row, different from the first row, of the pixel array. Therefore, the image sensor may enhance performance by securing an interval during which the preliminary shutter operation to reduce shutter noise such as a shutter band.

BRIEF DESCRIPTION OF THE DRAWINGS

Illustrative, non-limiting example embodiments will be more clearly understood from the following detailed description taken in conjunction with the accompanying drawings.

FIG. 20 is a block diagram illustrating an example embodiment of an interface that may be used in the electronic device of FIG. 17.

DETAILED DESCRIPTION

Figure 1:
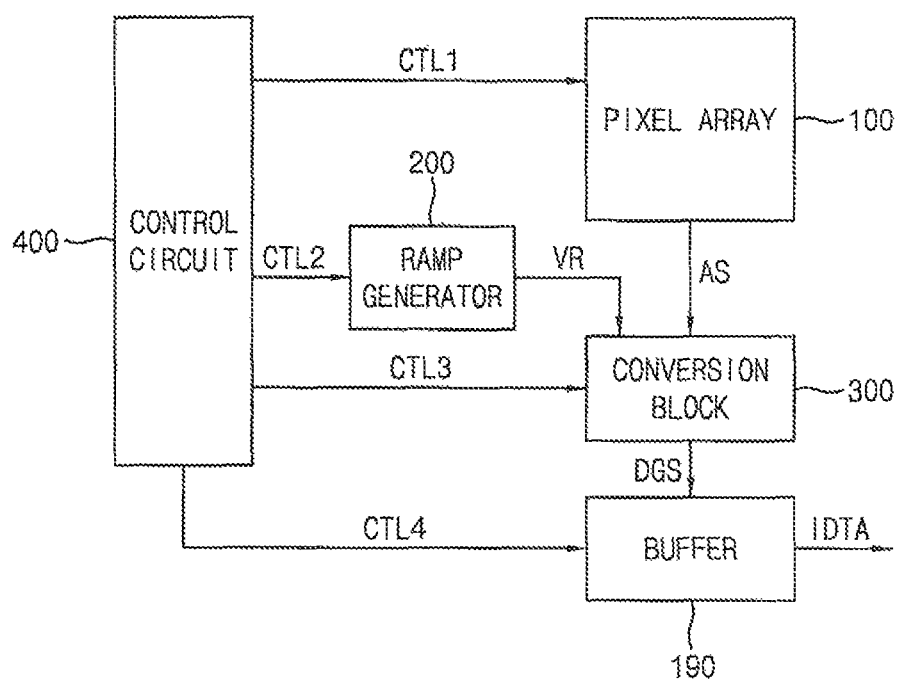
FIG. 1 is a block diagram illustrating an image sensor according to some example embodiments.

Various example embodiments will be described more fully with reference to the accompanying drawings, in which embodiments are shown. This inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concepts. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, decimals, steps, operations, elements, and/or components, but do not preclude the presence or addition of one or more other.

Unless otherwise defined, all terms (including technical and scientific terms) used herein have the same meaning as commonly understood by one of ordinary skill in the art to which this inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an image sensor according to some example embodiments.

Referring to FIG. 1, an image sensor 10 may include a pixel array 100, a ramp signal generator 200, a conversion block 300, a control circuit 400 and a buffer 190.

The pixel array 100 may detect incident light to generate an analog signal AS. The pixel array 100 may include a plurality of unit pixels arranged in the form of a matrix and each unit pixel may detect the incident light to generate the analog signal AS. Each unit pixel may convert incident light to an electric signal and may store and/or transmit the electric signal.

The ramp signal generator 200 may generate a ramp signal VR which linearly varies at a constant slope.

The conversion block 300 may perform a single-slope analog-to-digital conversion on the analog signal AS by using the ramp signal VR to generate a digital signal DGS. That is, the conversion block 300 may be an analog-to-digital conversion block.

The control circuit 400 may control operation of the pixel array 100 through a first control signal CTL1, may control operation of the ramp signal generator 200 through a second control signal CTL2, may control operation of the conversion block 300 through a third control signal CTL3 and may control operation of the buffer 190 through a fourth control signal CTLA.

The buffer 190 may temporarily store the digital signal DGS from the conversion block 300 and may perform sense and amplification operations on the digital signal DGS to generate corresponding image data IDTA to be output.

Figure 2:
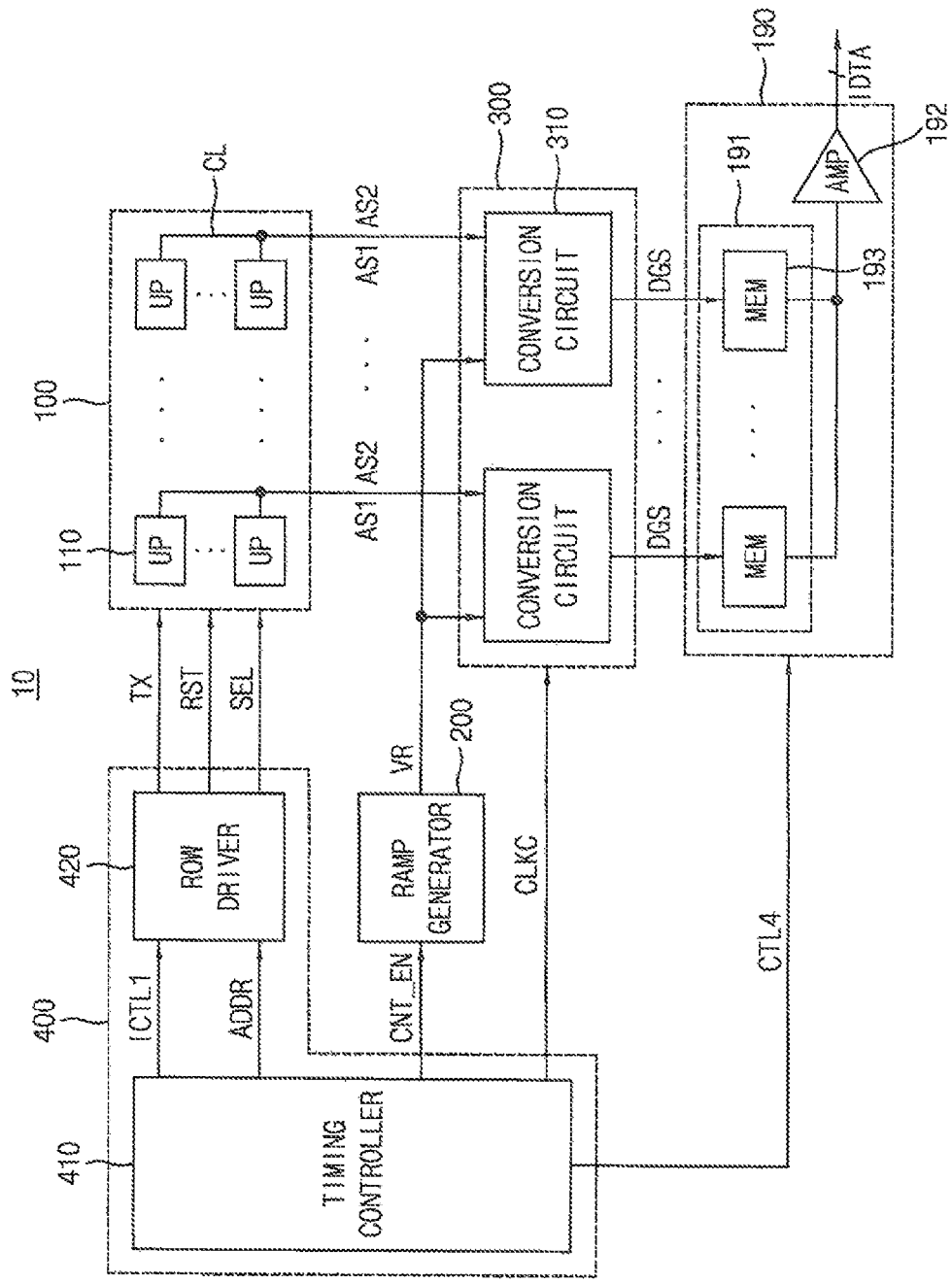
FIG. 2 further illustrates the image sensor of FIG. 1 according to some example embodiments.

FIG. 2 further illustrates the image sensor of FIG. 1 according to some example embodiments.

Referring to FIG. 2, the image sensor 10 may include, as before, the pixel array 100, the ramp signal generator 200, the conversion block 300, the control circuit 400 and the buffer 190.

The control circuit 400 may include a timing controller 410 and a row driver 420. The pixel array 100 may include a plurality of unit pixels 110 arranged in a matrix that includes a plurality of rows and a plurality of columns. The conversion block 300 may include a plurality of conversion circuits 310, and the conversion circuits 310 may be coupled to columns of the unit pixels 110 through a corresponding column line CL. The buffer 190 may include a column memory block 191 and a sense amplifier 192. The column memory block 191 may include a plurality of individual memories 193. The plurality of memories 193 may store the digital signals DGS provided from the conversion circuits 310. The sense amplifier 192 may sense and amplify the digital signals DGS stored in the column memory block 191 and then may output the image data IDTA.

The timing controller 410 may provide the row driver 420 with a first internal control signal ICTL1 and an address signal ADDR, and the row driver 420 may control operation of the unit pixels 110 of the pixel array 100 on a row basis based on the first internal control signal ICTL1 and the address signal ADDR. For example, the row driver 420 may control operation of the unit pixels 110 of the pixel array 100 on a row basis by applying a (row) selection control signal SEL, a reset control signal RST and/or a transfer control signal TX to the pixel array 100.

The pixel array 100 may generate a first analog signal AS1 representing a reset component and a second analog signal AS2 representing an image component based on the selection control signal SEL, the reset control signal RX and/or the transfer control signal TX provided from the row driver 420. Since each of the unit pixels 110 included in the pixel array 100 may have their own pixel property or logic property to output the analog signal AS, variation may occur in amplitude of the analog signal AS generated from the unit pixels 110 based on the same incident light. Thus, the effective component of the incident light may be extracted based on the difference between the reset component generated from each unit pixel 110 and the image component according to the incident light.

To this end, each of the unit pixels 110 included in the pixel array 100 may sequentially generate the first analog signal AS1 representing the reset component and the second analog signal AS2 representing the image component according to the incident light based on the selection control signal SEL, the reset control signal RST, and/or the transfer control signal TX provided from the row driver 420, and the conversion block 300 may generate a first digital signal corresponding to the first analog signal AS1 and a second digital signal corresponding to the second analog signal AS2 to output the digital signal DGS based on the difference between the first and second digital signals. Therefore, the digital signal DOS may represent the effective component of the incident light.

Figure 3:
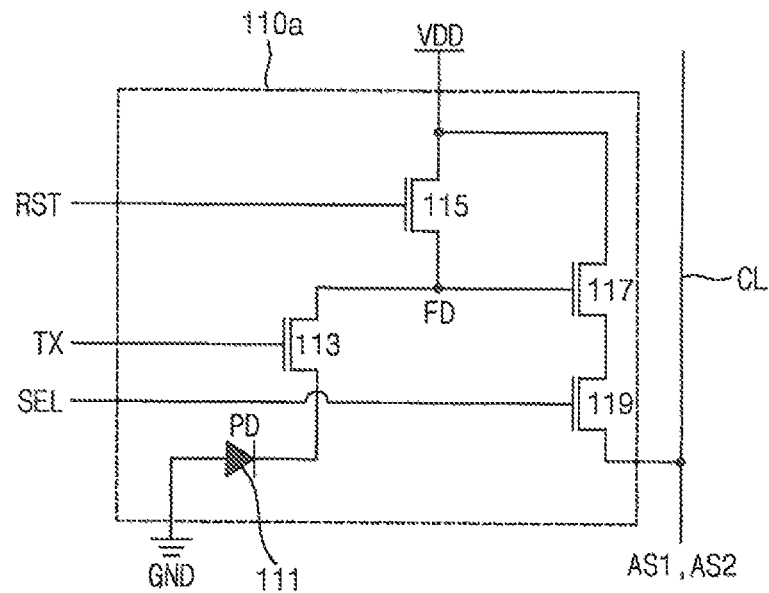
FIG. 3 is a circuit diagram illustrating an example embodiment of the unit pixel included in the pixel array in FIG. 2.

FIG. 3 is a circuit diagram illustrating an example embodiment of the unit pixel included in the pixel array in FIG. 2.

Referring to FIG. 3, a unit pixel 110a may include a photo detector (or, a photo sensitive device) (PD) 111, a transfer transistor 113, a reset transistor 115, a sensing transistor 117 and/or a selection transistor 119.

The photo detector 111 may have a first terminal coupled to a ground voltage GND and may convert the incident light to the electric signal. The transfer transistor 113 may be coupled to a second terminal of the photo detector 111 and a floating diffusion node FD. The reset transistor 115 may be coupled between a power supply voltage VDD and the floating diffusion node FD. The sensing transistor 117 may be coupled to the power supply voltage VDD and may have a gate coupled to the floating diffusion node FD. The selection transistor 119 may be coupled to the sensing transistor 117 and a corresponding column line CL.

Figure 4:
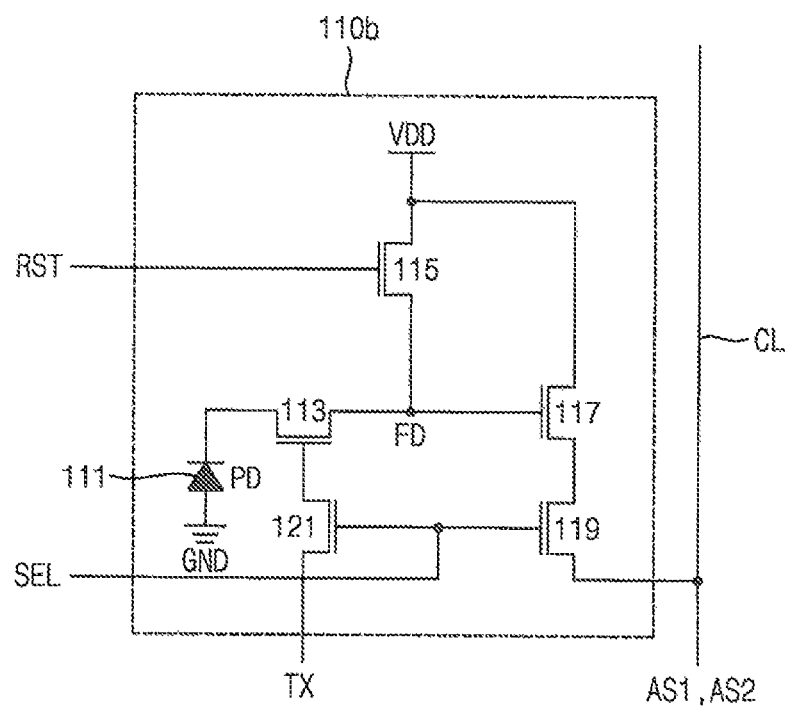
FIG. 4 is a circuit diagram illustrating another example embodiment of the unit pixel included in the pixel array in FIG. 2.

FIG. 4 is a circuit diagram illustrating another example embodiment of the unit pixel included in the pixel array in FIG. 2.

Unit pixel 110b of FIG. 4 may differ from the unit pixel 110a at least in that the unit pixel 110b further includes a transistor 121. The transistor 121 may have a first terminal coupled to a gate of the transfer transistor 113, a gate coupled to a gate of the selection transistor 119, and a second terminal receiving the transfer control signal TX.

Hereinafter, the operation of the unit pixel 110a will be described with reference to FIGS. 2 and 3.

The photo detector 111 may detect the incident light to generate electron-hole pair (EHP) and the EHP may be accumulated in a source node of the transfer transistor 113.

The row driver 420 may provide an activated select control signal SEL to the pixel array 100 to turn on the row selection transistor 119 to select one of rows included in the pixel array 100 and may provide an activated reset control signal RST to the selected row to turn on the reset transistor 115. Therefore, an electric potential of the floating diffusion node FD may have a level of the power supply voltage VDD and the sensing transistor 117 may be turned on so that the first analog signal AS1 representing the reset component is output from the unit pixel 110a. Then, the row driver 420 may deactivate the reset control signal RST.

Meanwhile, the row driver 420 may provide an activated transfer control signal TX to the pixel array 100 to turn on the transfer transistor 113 so that the electrons of the EHP accumulated in the source node of the transfer transistor 113 may be transferred to the floating diffusion node FD. The electric potential of the floating diffusion node FD may vary depending on the quantity of the electrons of the EHP and the electric potential of a gate of the sensing transistor 117 may also vary. If the selection transistor 119 is in a turn-on state, the second analog signal AS2 corresponding to the electric potential of the floating diffusion node FD may be output from the unit pixel 110a.

Then, the row driver 420 may sequentially output the first and second analog signals AS1 and AS2 in a row unit by repeating the above operation with respect to subsequent rows.

Referring again to FIG. 2, the timing controller 410 may provide a count enable signal CNT_EN to the ramp signal generator 200 to control the operation of the ramp signal generator 200. The ramp signal generator 200 may generate the ramp signal VR which descends with a constant slope during an active interval where the count enable signal CNT_EN is enabled.

Figure 5:
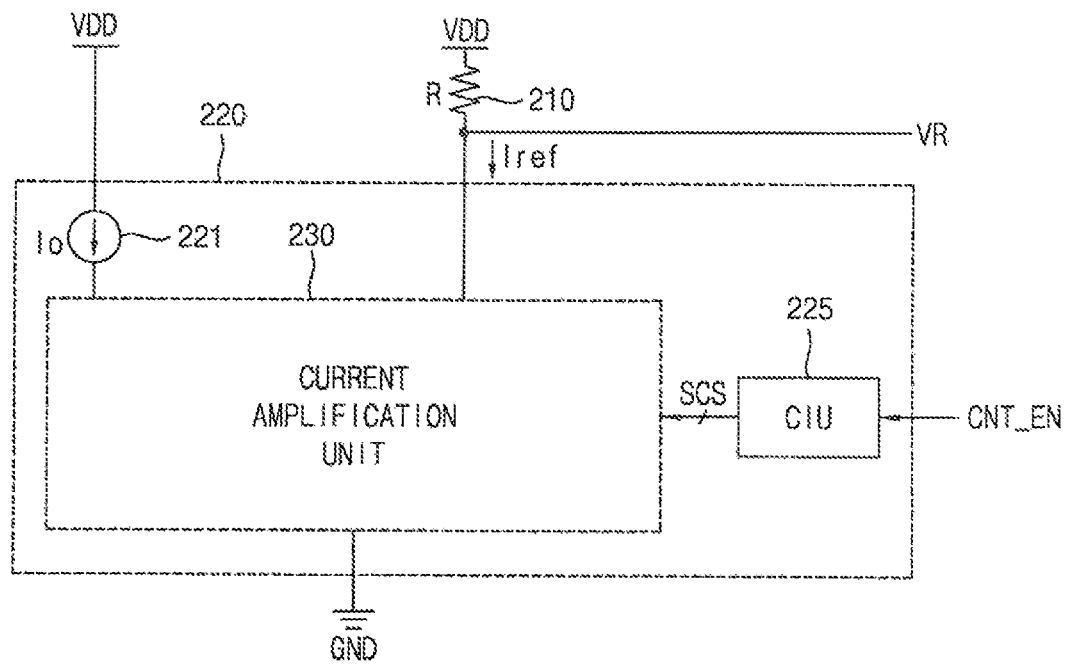
FIG. 5 is a circuit diagram illustrating an example embodiment of the ramp signal generator in FIG. 2.

FIG. 5 is a circuit diagram illustrating an example embodiment of the ramp signal generator in FIG. 2.

Referring to FIG. 5, the ramp signal generator 200 may include a resistor 210 and a current generating unit 220.

The resistor 210 may be connected between the power supply voltage VDD and the current generating unit 220 and may have a constant resistance value R.

The current generating unit 220 may be connected between the resistor 210 and the ground voltage GND. The current generating unit 220 can receive the count enable signal CNT_EN from the control circuit 400. The current generating unit 220 may generate the reference current Iref which increases at a constant rate during the active interval where the count enable signal CNT_EN is enabled.

The current generating unit 220 may include a constant current source 221, a current amplification unit 230 and a current control unit (CIU) 225.

The constant current source 221 may generate a constant current Io having a constant magnitude. The current amplification unit 230 may amplify the constant current Io based on amplifying control signals SCS supplied from the current control unit 225. Although not illustrated in FIG. 5, the current amplification unit 230 may include a plurality of switches and a plurality of current mirrors.

The current control unit 225 may generate the amplifying control signals SCS based on the count enable signal CNT_EN and may supply the amplifying control signals SCS to the switches of the current amplification unit 230 to adjust the amplitude of the reference current Iref flowing through the resistor 210 by selectively turning on/off the switches.

The ramp signal generator 200 may output the ramp signal VR from the node where the resistor 210 is connected to the current amplification unit 230.

The current control unit 225 may open all of the switches of the current amplification unit 230 to output the ramp signal VR having a maximum value and may reduce the magnitude of the ramp signal VR by sequentially short-circuiting the switches during the active interval where the count enable signal CNT_EN is enabled.

Referring again to FIG. 2, the timing controller 410 may provide a count clock signal CLKC to the conversion block 300 to control the operation of the conversion block 300. The count clock signal CLKC may be a signal toggling during the active interval where the count enable signal CNT_EN is enabled.

The conversion block 300 may generate the digital signal DOS representing the effective component of the incident light based on the first and second analog signals AS1 and AS2 sequentially provided from the pixel array 100.

The buffer may sequentially output the digital signal DOS as image data IDTA, which are received from the conversion block 300 and which correspond to one row, based on the fourth control signal CTL4 received from the timing controller 410. The image data IDTA sequentially output from the buffer 190 may be provided to a digital signal processor.

Figure 6:
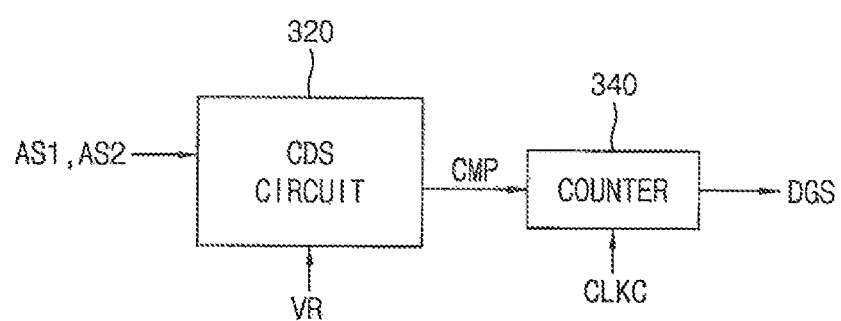
FIG. 6 is a block diagram illustrating an example embodiment of one of the conversion circuits in FIG. 2.

FIG. 6 is a block diagram illustrating an example embodiment of one of the conversion circuits in FIG. 2.

Referring to FIG. 6, the conversion circuit 310 may include a correlated double sampling (CDS) circuit 320 and a counter 340.

The CDS circuit 320 may generate a reset signal corresponding to the reset component and an image signal corresponding to the signal component by performing the correlated double sampling on the first and second analog signals AS1 and AS2, respectively. In addition, the CDS circuit 320 may generate a comparison signal CMP by comparing the reset signal and the image signal with the ramp signal VR, respectively. For example, the CDS circuit 320 may output the comparison signal CMP with a logic high level when the reset signal or the image signal is smaller than the ramp signal VR. The CDS circuit 320 may output the comparison signal CMP with a logic low level when the reset signal or the image signal is equal to or greater than the ramp signal VR.

The counter 340 may generate the digital signal DGS based on the comparison signal CMP and the count clock signal CLKC. For example, when the CDS circuit 320 outputs the comparison signal CDS by performing the correlated double sampling on the reset component, the counter 340 may generate a first counting value by performing a counting operation in synchronization with the count clock signal CLKC until the comparison signal CMP transitions to a logic low level. When the CDS circuit 320 outputs the comparison signal CDS by performing the correlated double sampling on the signal component, the counter 340 may generate a second counting value by performing a counting operation in synchronization with the count clock signal CLKC until the comparison signal CMP transitions to a logic low level. The counter 340 may generate the digital signal DGS by subtracting the first counting value from the second counting value.

Figure 7:
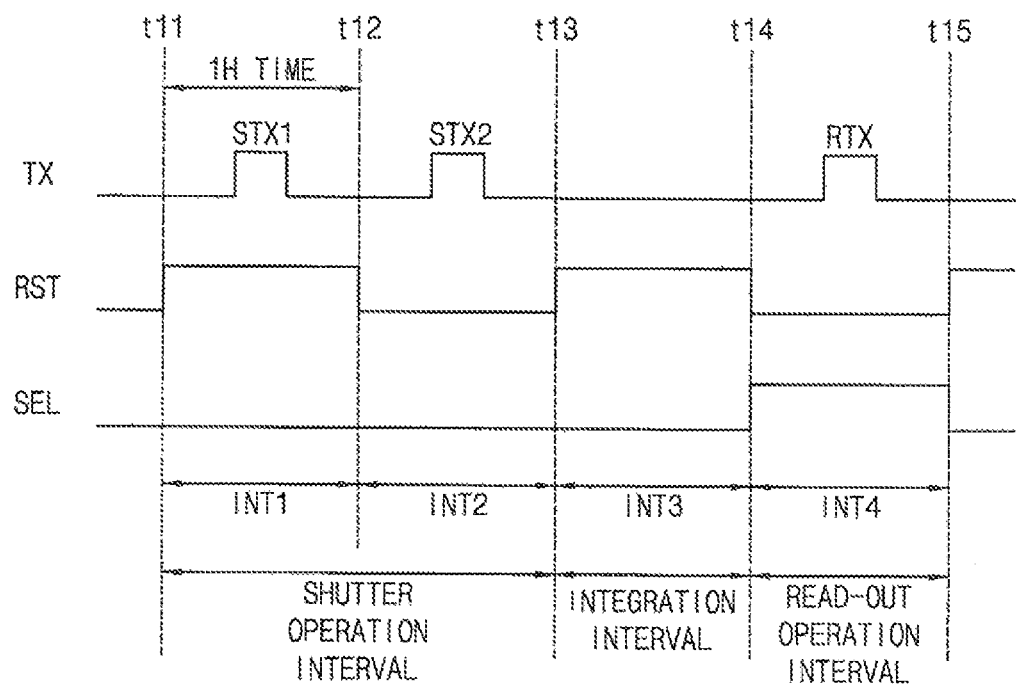
FIG. 7 is a timing diagram illustrating operation of the row driver and the pixel array in the image sensor of FIG. 2.

FIG. 7 is a timing diagram illustrating operation of the row driver and the pixel array in the image sensor of FIG. 2.

Referring to FIGS. 2, 3 and 7, the row driver 420 may sequentially scan a plurality of rows of unit pixels 110 based on the first internal control signal ICTL1 and the address signal ADDR, may sequentially perform an electronic shutter operation to reset an electric signal already stored in each of the unit pixels 110 and a read-out operation to read-out the electric signal stored in each of the unit pixels 110. The row driver 420 may perform the electronic shutter operation and the read-out operation by applying the transfer control signal TX, the reset control signal RST, and the selection control signal SEL. The electronic shutter operation may include a preliminary shutter operation and a main shutter operation which are sequentially performed on one row. The row driver 420 may overlap a period of the main shutter operation on a first row of the plurality of rows and a period of the preliminary shutter operation on a second row, different from the first row, of the plurality of rows. For example, at least a portion of the main shutter operation of the first row and the preliminary shutter operation on the second row may be overlapped, or the main shutter operation of the first row and the preliminary shutter operation on the second row may be synchronized with each other. The row driver 420 may perform the electronic shutter operation to eliminate (reset) signal charges accumulated in the photo detector before performing the read-out operation. The preliminary shutter operation and the main shutter operation may efficiently remove the charges accumulated in the photo detector of a unit pixel by turning on multiple times the transfer transistor 113 in FIGS. 3 and 4 which resets the photo detector.

In FIG. 7, each time interval t1 to t12, t12 to t13, t13 to t14 and t14 to t15 may correspond to one horizontal scanning time (1H) for the row driver 420 to scan one row. The scanning operation in a row may include the preliminary shutter operation, main shutter operation and the read-out operation to sense a plurality of unit pixel values in the row. The horizontal scanning time (1H) may be defined as an average time to scan a row among the plurality of rows of the pixel array 100 or a time difference of row selection between successive rows in the pixel array 100 when the plurality of rows are scanned sequentially. The row driver 420 may perform a preliminary shutter operation on one row within a first 1H time and perform a main shutter operation on the one row within a second 1H time after the first 1H time.

In FIG. 7, an interval between times t11 to t13 may correspond to an electronic shutter interval during which the electronic shutter operation is performed, an interval between times t13 to t14 may correspond to an integration interval INT3 during which electric signal is accumulated in the unit pixel 110, and an interval between times t14 to t15 may correspond to a read-out interval INT4 during which the read-out operation is performed. The electronic shutter interval may include a preliminary shutter interval INT1 during which the preliminary shutter operation is performed and a main shutter interval INT2 during which the main shutter operation is performed.

The row driver 420 may perform the preliminary shutter operation by applying the transfer control signal TX, which is activated within the preliminary shutter interval INT1, to the transfer transistor 113 as a preliminary shutter pulse STX1, may perform the main shutter operation by applying the transfer control signal TX, which is activated within the main shutter interval INT2, to the transfer transistor 113 as a main shutter pulse STX2, and may perform the read-out operation by applying the transfer control signal TX, which is activated within the read-out interval INT4, to the transfer transistor 113, as a read-out pulse RTX.

The row driver 420 may activate the preliminary shutter pulse STX1 within a first 1H time t11 to t12, may activate the main shutter pulse STX2 within a second 1H time t12 to t13 and may activate the read-out pulse RTX within a third 1H time t14 to t15. The second 1H time t12 to t13 may be consecutive to the first 1H time t11 to t12 and the third 1H time t14 to t15 may be one 1H time interval behind from the second 1H time t12 to t13. In addition, the row driver 420 may activate the reset control signal RST during the preliminary shutter interval INT1, may deactivate the reset control signal RST during the main shutter interval INT2, and may deactivate the reset control signal RST during the read-out interval INT4. The row driver 420 may activate the selection control signal SEL during the read-out interval INT4.

Figure 8:
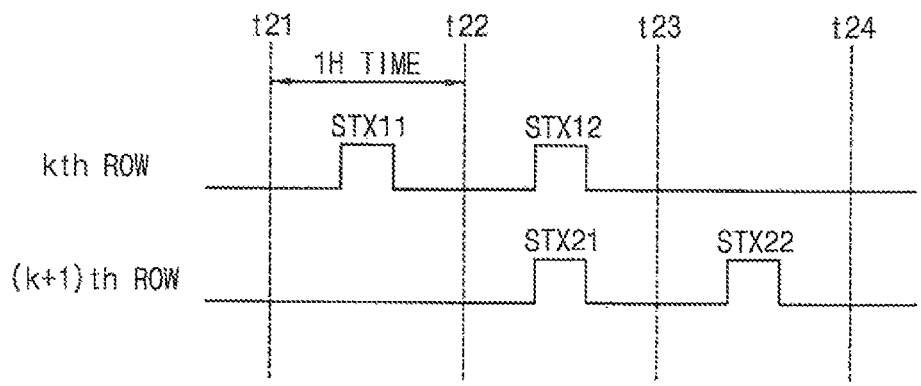
FIG. 8 is a timing diagram illustrating operation of the row driver and adjacent two rows in the image sensor of FIG. 2.

FIG. 8 is a timing diagram illustrating operation of the row driver and adjacent two rows in the image sensor of FIG. 2.

In FIG. 8, each time interval t21 to t22, t22 to t23 and t23 to t24 may correspond to one horizontal scanning time (1H) required for the row driver 420 to scan one row.

Referring to FIGS. 2, 3 and 8, between times t21 to t22, the row driver 420 may perform the preliminary shutter operation by applying the transfer control signal TX to the transfer transistor 113 of a unit pixel 110 in a first row (kth row, where k is integer greater than zero) as a preliminary shutter pulse STX11, and may perform the main shutter operation by applying the transfer control signal TX to the transfer transistor 113 of the unit pixel 110 in the first row as a main shutter pulse STX12 between times t22 to t23. In addition, between times 122 to t23, the row driver 420 may perform the preliminary shutter operation by applying the transfer control signal TX to the transfer transistor 113 of a unit pixel 110 in a second row ((k+1)th row) as a preliminary shutter pulse STX21, and may perform the main shutter operation by applying the transfer control signal TX to the transfer transistor 113 of the unit pixel 110 in the second row as a main shutter pulse STX22 between times t23 to t24. The row driver 420 may simultaneously perform the main shutter operation on the first row and the preliminary shutter operation on the second row different from the first row by one row. That is, the row driver 420 may overlap the main shutter operation on the first row and the preliminary shutter operation on the second row. For example, at least a portion of the main shutter operation of the first row and the preliminary shutter operation on the second row may be overlapped, or the main shutter operation of the first row and the preliminary shutter operation on the second row may be synchronized with each other. Therefore, shutter noise may be reduced because the preliminary shutter operation may be used although the 1H time is decreased.

Figure 9:
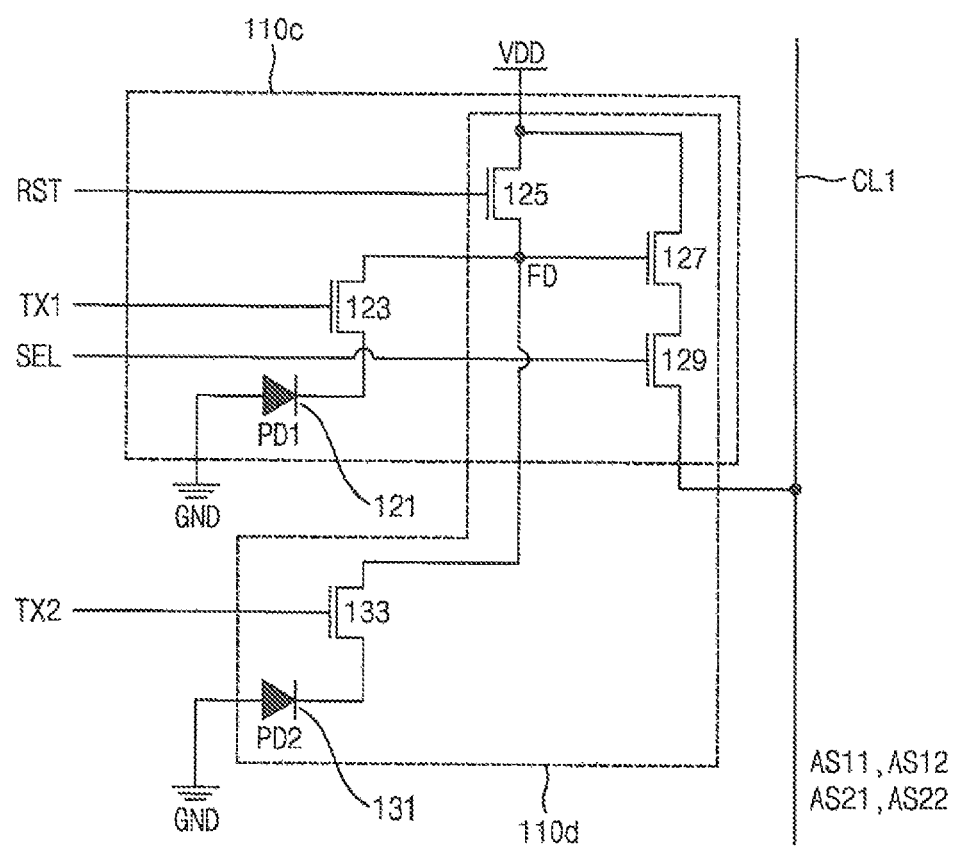
FIG. 9 is a circuit diagram illustrating a first unit pixel and a second unit pixel adjacent to each other in a column direction in the image sensor of FIG. 2.

FIG. 9 is a circuit diagram illustrating a first unit pixel and a second unit pixel adjacent to each other in a column direction in the image sensor of FIG. 2.

Referring to FIGS. 2 and 9, the unit pixels 110 include a first unit pixel 110c and a second unit pixel 110d which are alternatively arranged in a column direction.

The first unit pixel 110c may include a first a photo detector (PD) 121, a first transfer transistor 123, a reset transistor 125, a sensing transistor 127 and a selection transistor 129.

The first photo detector 121 may have a first terminal coupled to a ground voltage GND and may convert the incident light to an electric signal. The first transfer transistor 123 may be coupled to a second terminal of the first photo detector 121 and a floating diffusion node FD. The reset transistor 125 may be coupled between a power supply voltage VDD and the floating diffusion node FD. The sensing transistor 127 may be coupled to the power supply voltage VDD and may have a gate coupled to the floating diffusion node FD. The selection transistor 129 may be coupled to the sensing transistor 127 and a corresponding column line CL1.

The second unit pixel 110d may include a second a photo detector (PD) 131, a second transfer transistor 133, the reset transistor 125, the sensing transistor 127 and the selection transistor 129. The second unit pixel 110d may share the reset transistor 125, the sensing transistor 127 and the selection transistor 129 with the first unit pixel 110c.

When the first transfer transistor 123 is turned on in response to a first transfer control signal TX1, analog signals AS11 and AS12 from the first unit pixel 110c may be provided to the corresponding conversion circuit 310 in FIG. 2 through the column line CL1, and when second transfer transistor 133 is turned on in response to a second transfer control signal TX2, analog signals AS21 and AS22 from the second unit pixel 110d may be provided to the corresponding conversion circuit 310 in FIG. 2 through the column line CL1.

Although the reset transistor 125, the sensing transistor 127 and the selection transistor 129 are shared between two rows, the inventive concepts are not limited thereto. Each of the two rows may have a reset transistor, a sensing transistor and/or a selection transistor separately.

Figure 10:
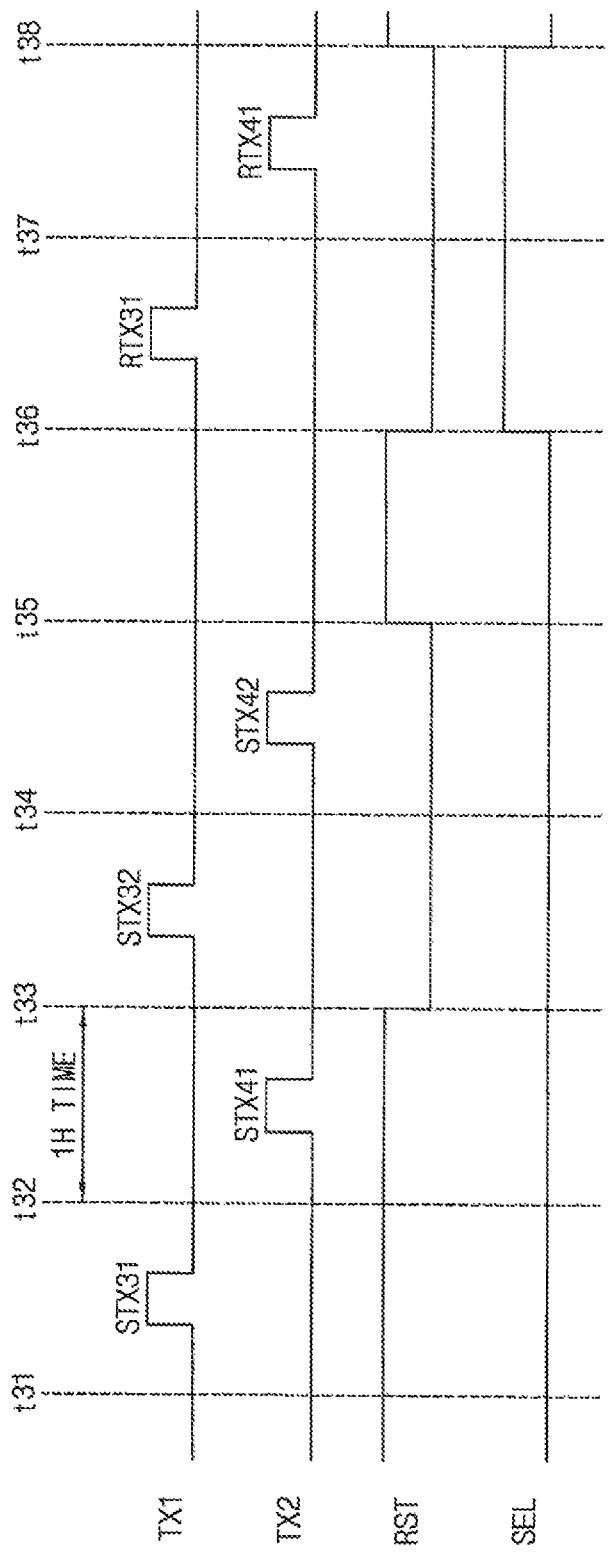
FIG. 10 illustrates operation of the first and second unit pixels when the pixel array in the image sensor of FIG. 2 may be implemented with the configuration of FIG. 9.

FIG. 10 illustrates operation of the first and second unit pixels when the pixel array in the image sensor of FIG. 2 may be implemented with the configuration of FIG. 9.

In FIG. 10, each time interval t31 to t32, t32 to t33, t33 to t34, t34 to t35, t35 to t36, t36 to t37, and t37 to t38 may correspond to one horizontal scanning time (1H) for the row driver 420 to scan one row.

Referring to FIGS. 2, 9 and 10, the row driver 420 may perform the preliminary shutter operation by applying the first transfer control signal TX1 to the first transfer transistor 123 in the first unit pixel 110c as a preliminary shutter pulse STX31 between times t31 to t32, may perform the main shutter operation by applying the first transfer control signal TX1 to the first transfer transistor 123 as a main shutter pulse STX32 between times 133 to t34, and may perform the read-out operation by applying the first transfer control signal TX1 to the first transfer transistor 123, as a read-out pulse RTX31 between times t36 to t37.

The row driver 420 may perform the preliminary shutter operation by applying the second transfer control signal TX2 to the second transfer transistor 133 in the second unit pixel 110d as a preliminary shutter pulse STX41 between times t32 to t33, and may perform the main shutter operation by applying the second transfer control signal TX2 to the second transfer transistor 133 as a main shutter pulse STX42 between times t34 to t35.

The row driver 420 may activate the reset control signal RST applied to the reset transistor 125 shared by the first and second unit pixels 110c and 110d during the preliminary shutter interval between time t31 to t33, may deactivate the reset control signal RST during the main shutter interval between time t33 to t35, may activate the reset control signal RST between times t35 to t36 and may deactivate the reset control signal RST during the read-out interval between time t36 to t38. The row driver 420 may activate the selection control signal SEL applied to the selection transistor 129 shared by the first and second unit pixels 110c and 110d during the read-out interval between time t36 to t38.

In FIG. 10, the preliminary shutter pulse STX31 applied to one row may be activated within a first 1H time and the main shutter pulse STX32 may be activated within a second 1H time which is two 1H times interval behind from the first 1H time.

Figure 11:
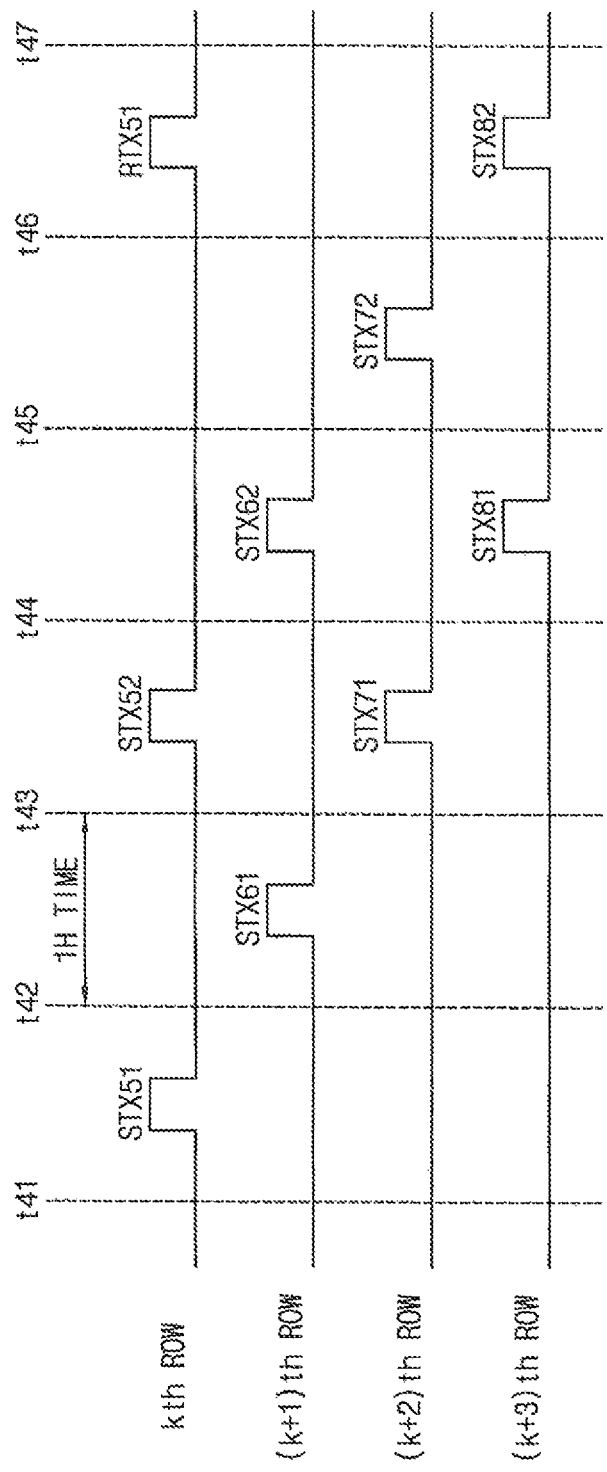
FIG. 11 illustrates operation of four rows adjacent in a column direction when the pixel array in the image sensor of FIG. 2 may be implemented with the configuration of FIG. 9.

FIG. 11 illustrates operation of four rows adjacent in a column direction when the pixel array in the image sensor of FIG. 2 may be implemented with the configuration of FIG. 9.

In FIG. 11, each time interval t41 to t42, t42 to t43, t43 to t44, t44 to t45, t45 to t46 and t46 to t47 may correspond to one horizontal scanning time (1H) for the row driver 420 to scan one row.

Referring to FIGS. 2, 9 and 11, the row driver 420 may perform the preliminary shutter operation by applying the transfer control signal TX to the transfer transistor of a unit pixel in a first row (kth row) as a preliminary shutter pulse STX51 between times t41 to t42, may perform the main shutter operation by applying the transfer control signal TX to the transfer transistor of the unit pixel in the first row as a main shutter pulse STX52 between times t43 to t44, and may perform the read-out operation by applying the transfer control signal TX to the transfer transistor of the unit pixel in the first row as a read-out pulse RTX51 between times t46 to t47. In addition, the row driver 420 may perform the preliminary shutter operation by applying the transfer control signal TX to the transfer transistor of a unit pixel in (k+1)th row as a preliminary shutter pulse STX61 between times t42 to t43, and may perform the main shutter operation by applying the transfer control signal TX to the transfer transistor of the unit pixel in the (k+1)th row as a main shutter pulse STX62 between times t44 to t45.

In addition, the row driver 420 may perform the preliminary shutter operation by applying the transfer control signal TX to the transfer transistor of a unit pixel in a second row ((k+2)th row) as a preliminary shutter pulse STX71 between times t43 to t44, and may perform the main shutter operation by applying the transfer control signal TX to the transfer transistor of the unit pixel in the second row as a main shutter pulse STX72 between times t45 to t46. In addition, the row driver 420 may perform the preliminary shutter operation by applying the transfer control signal TX to the transfer transistor of a unit pixel in (k+3)th row as a preliminary shutter pulse STX81 between times t44 to t45, and may perform the main shutter operation by applying the transfer control signal TX to the transfer transistor of the unit pixel in the (k+3)th row as a main shutter pulse STX82 between times t46 to t47.

That is, the row driver 420 may perform the preliminary shutter operation on one row within a first 1H time and may perform the main shutter operation on the one row within a second 1H time which is two 1H times interval after the first 1H time. The row driver 420 may simultaneously perform the main shutter operation on the first row and the preliminary shutter operation on the second row different from the first row by two rows. That is, the row driver 420 may overlap the main shutter operation on the first row (kth row, k is an integer greater than zero) and the preliminary shutter operation on the second row ((k+2)th row) which is different from the first row by two rows. That is, the row driver 420 may overlap the main shutter operation on the first row and the preliminary shutter operation on the second row.

In FIG. 11, there is description on the operation of the row driver 420 when the pixel array 100 is implemented with two-shared pixel configuration as in FIG. 9. When each of four unit pixels adjacent in a column direction includes a photo detector and a transfer transistor and the four unit pixels have a four-shared configuration that shares a reset transistor, a sensing transistor and a selection transistor, the driver 420 may overlap the main shutter operation on the first row and the preliminary shutter operation on the second row which is different from the first row by four rows. That is, the row driver 420 may overlap the main shutter operation on the first row and the preliminary shutter operation on the second row.

Figure 12:
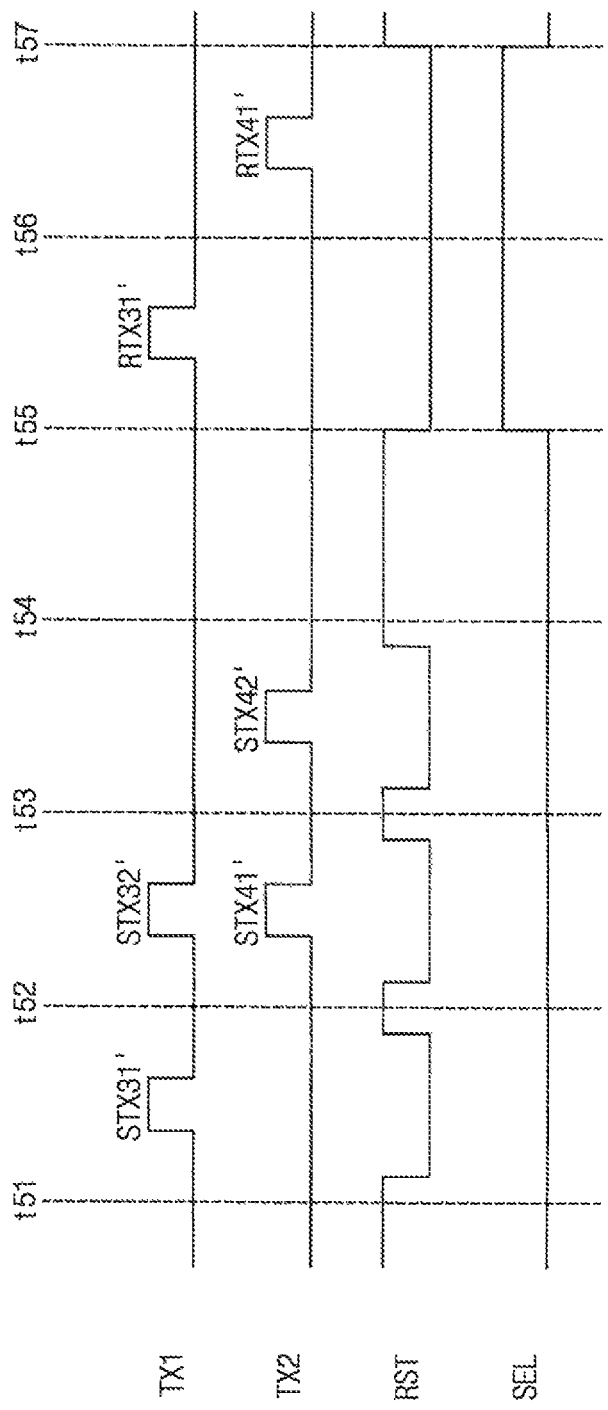
FIG. 12 illustrates operation of the first and second unit pixels when the pixel array in the image sensor of FIG. 2 may be implemented with the configuration of FIG. 9.

FIG. 12 illustrates operation of the first and second unit pixels when the pixel array in the image sensor of FIG. 2 may be implemented with the configuration of FIG. 9.

In FIG. 12, each time interval t51 to t52, t52 to t53, t53 to t54, t54 to t55, t55 to t56 and t56 to t57 may correspond to one horizontal scanning time (1H) for the row driver 420 to scan one row.

Referring to FIGS. 2, 9 and 12, the row driver 420 may perform the preliminary shutter operation by applying the first transfer control signal TX1 to the first transfer transistor 123 in the first unit pixel 110c as a preliminary shutter pulse STX31' between times t51 to t52, may perform the main shutter operation by applying the first transfer control signal TX1 to the first transfer transistor 123 as a main shutter pulse STX32' between times t52 to t153, and may perform the read out operation by applying the first transfer control signal TX1 to the first transfer transistor 123, as a read-out pulse RTX31' between times t55 to t56.

The row driver 420 may perform the preliminary shutter operation by applying the second transfer control signal TX2 to the second transfer transistor 133 in the second unit pixel 110d as a preliminary shutter pulse STX41' between times t52 to t53, may perform the main shutter operation by applying the second transfer control signal TX2 to the second transfer transistor 133 as a main shutter pulse STX42' between times t53 to t54, and may perform the read out operation by applying the first transfer control signal TX2 to the second transfer transistor 133, as a read-out pulse RTX41' between times t156 to t157.

The row driver 420 may deactivate the reset control signal RST applied to the reset transistor 125 shared by the first and second unit pixels 110c and 110d within each interval between times t51 to t52, t52 to t53 and t53 to t54 while the first transfer control signal TX1 and the second transfer control signal TX2 are activated, may activate the reset control signal RST between times t154 to t55, and may deactivate the reset control signal RST between times t55 to t57. The row driver 420 may activate the selection control signal SEL applied to the selection transistor 129 shared by the first and second unit pixels 110c and 110 d during the read-out interval between times t55 to t57.

In FIG. 12, the preliminary shutter pulse STX31' applied to one row may be activated within a first 1H time and the main shutter pulse STX32' may be activated within a second 1H time which is consecutive to the first 1H time. In this case, the reset control signal RST may have a same logic level in each of the preliminary shutter interval and the main shutter interval.

Although FIGS. 10 to 12 illustrate operation of the first and second unit pixels based on the configuration of FIG. 9, the inventive concepts are not limited thereto. When each of the two rows associated with the first and second transfer control gates TX1 and TX2 may have a reset transistor, a sensing transistor and/or a selection transistor separately, two selection control signals may be used to scan the two rows.

Figure 13:
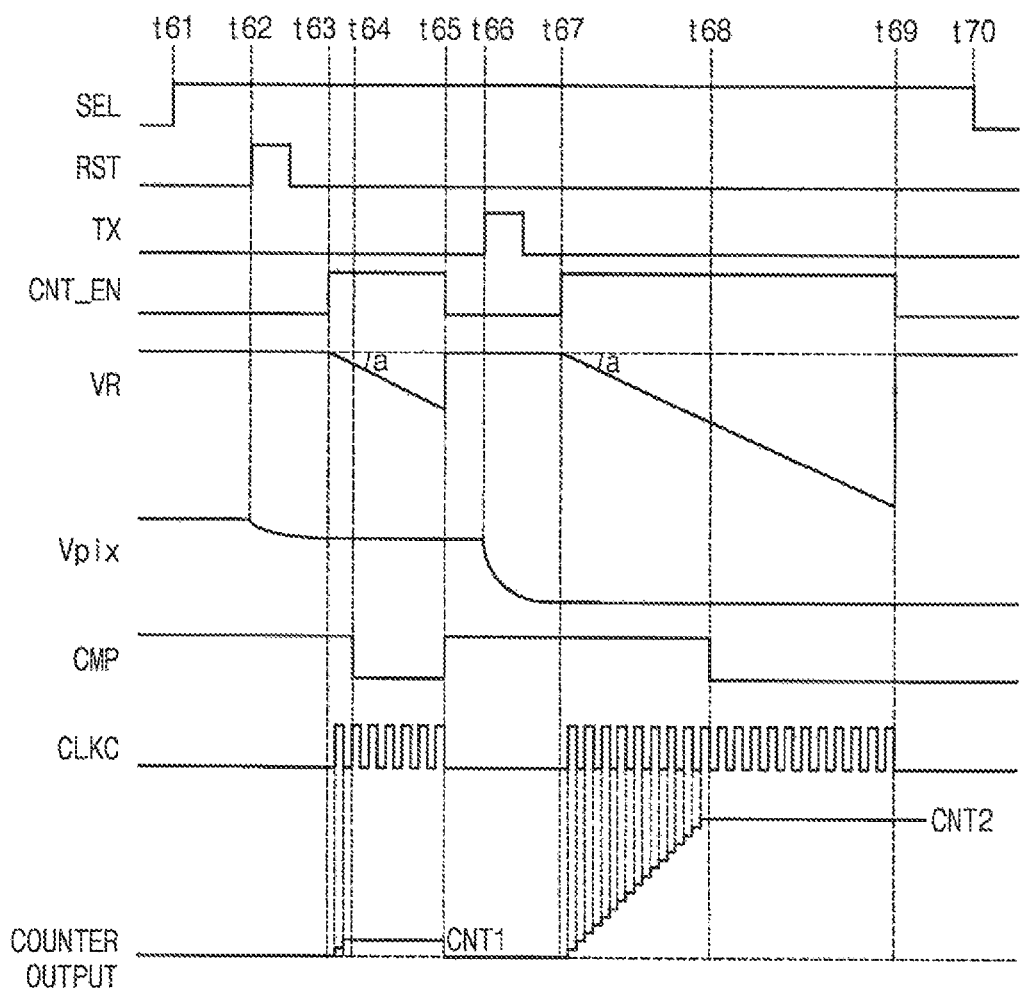
FIG. 13 is a timing diagram for explaining the operation of the correlated double sampling circuit in FIG. 6.

FIG. 13 is a timing diagram for explaining the operation of the correlated double sampling circuit in FIG. 6.

Hereinafter, the operation of the image sensor 10 of FIG. 2 will be described with reference to FIGS. 1 to 6 and 13.

At a time t61, the row driver 420 may provide the selection control signal SEL, which may be activated to have a logic high level, to the pixel array 100 to select one of the rows included in the pixel array 100.

At a time t62, the row driver 420 may provide the reset control signal RST to the selected row. At this time, a pixel voltage signal Vpix output from the pixel array 100 may be the first analog signal AS1 representing the reset component.

At a time t63, the timing controller 410 may provide the count enable signal CNT_EN having the logic high level to the ramp signal generator 200 and the ramp signal generator 200 may start to reduce the voltage level of the ramp signal VR at a constant slope (a). In addition, the timing controller 410 may provide the count clock signal CLKC to the counter 340 and the counter 340 may perform the counting operation in synchronization with the count clock signal CLKC.

At a time t64, the ramp signal VR and the reset signal may have substantially the same voltage level and the comparison signal CMP output from the CDS circuit 320 may transition to a logic low level so that the counting operation is terminated. At this time, the counter 340 may generate a first counting value CNT1 corresponding to the reset signal.

At a time t65, if the count enable signal CNT_EN is deactivated to have a logic low level, the ramp signal generator 200 may be disabled. The interval from the time t63 to the time t65 may represent a maximum interval to count the reset signal and may be appropriately set to correspond to a number of clock cycles according to the characteristics of the image sensor 10.

At a time t66, the row driver 420 may provide the transfer control signal TX to the selected row. At this time, a pixel voltage signal Vpix output from the pixel array 100 may be the second analog signal AS2 representing the image component.

At a time t67, the timing controller 410 may provide again the count enable signal CNT_EN having a logic high level to the ramp signal generator 200 and the ramp signal generator 200 may start to reduce the voltage level of the ramp signal VR at a constant slope (a) substantially identical to the slope in the time t63. In addition, the timing controller 410 may provide the count clock signal CLKC to the counter 340 and the counter 340 may perform the counting operation in synchronization with the count clock signal CLKC.

At a time t68, the ramp signal VR and the image signal may have substantially the same voltage level and the comparison signal CMP output from the CDS circuit 320 may transition to a logic low level so that the counting operation is terminated. At this time, the second counter 340 may generate a second count value CNT2 corresponding to the image signal. The counter 340 may output the digital signal DOS representing the effective component of the incident light by subtracting the first count value CNT1 from the second count value CNT2.

At a time point t69, if the count enable signal CNT_EN is deactivated to have a logic low level, the ramp signal generator 200 may be disabled. The interval from the time t67 to the time t69 may represent a maximum interval to count the image signal and may be appropriately set to correspond to a number of clock cycles according to the characteristics of the image sensor 10.

At a time t70, the row driver 420 may provide the selection control signal SEL, which may be deactivated to have a logic low level, to the pixel array 100 to cancel the selection for the selected row.

After the time t70, the image sensor 10 may repeat the above operation with respect to other rows to output the digital signal DGS per row.

Figure 14:
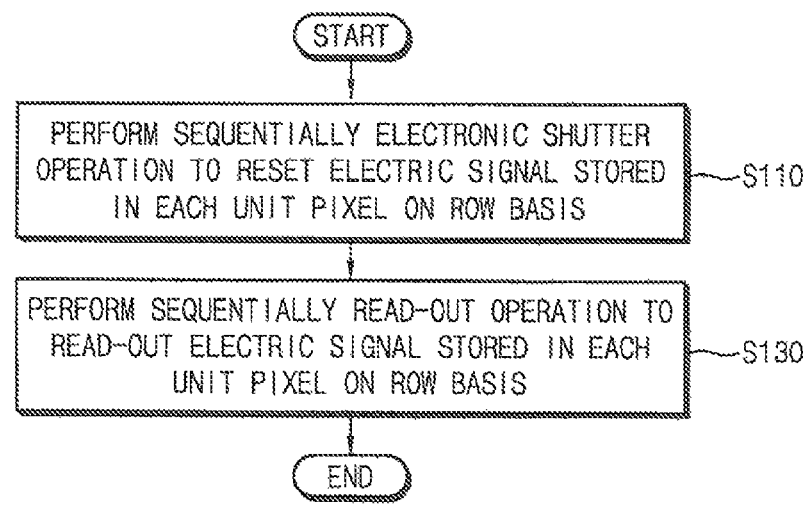
FIG. 14 is a flow chart illustrating a method of operating an image sensor according to some example embodiments.

FIG. 14 is a flow chart illustrating a method of operating an image sensor according to some example embodiments.

Referring to FIGS. 1 through 14, in a method of operating an image sensor, the image sensor 10 may include a pixel array 100 having a plurality of unit pixels 110 arranged in a matrix that includes a plurality of rows and a plurality of columns. Each of the unit pixels 110 may convert incident light to an electric signal. The row driver 420 coupled to the pixel array 100 may sequentially perform an electronic shutter operation to reset an electric signal already stored in each of the unit pixels 110 on a row-basis (S110). The row driver 420 may sequentially perform a read-out operation to read-out the electric signal stored in each of the unit pixels 110 on a row-basis (S130).

As described with reference to FIGS. 7 through 12, the electronic shutter operation may include a preliminary shutter operation and a main shutter operation which are sequentially performed on one row. The row driver 420 may overlap the main shutter operation on a first row of the plurality of rows and the preliminary shutter operation on a second row, different from the first row, of the plurality of rows. The preliminary shutter operation on one row may be performed within a first 1H time and the main shutter operation on the one row may be performed within a second 1H time after the first 1H time.

Figure 15:
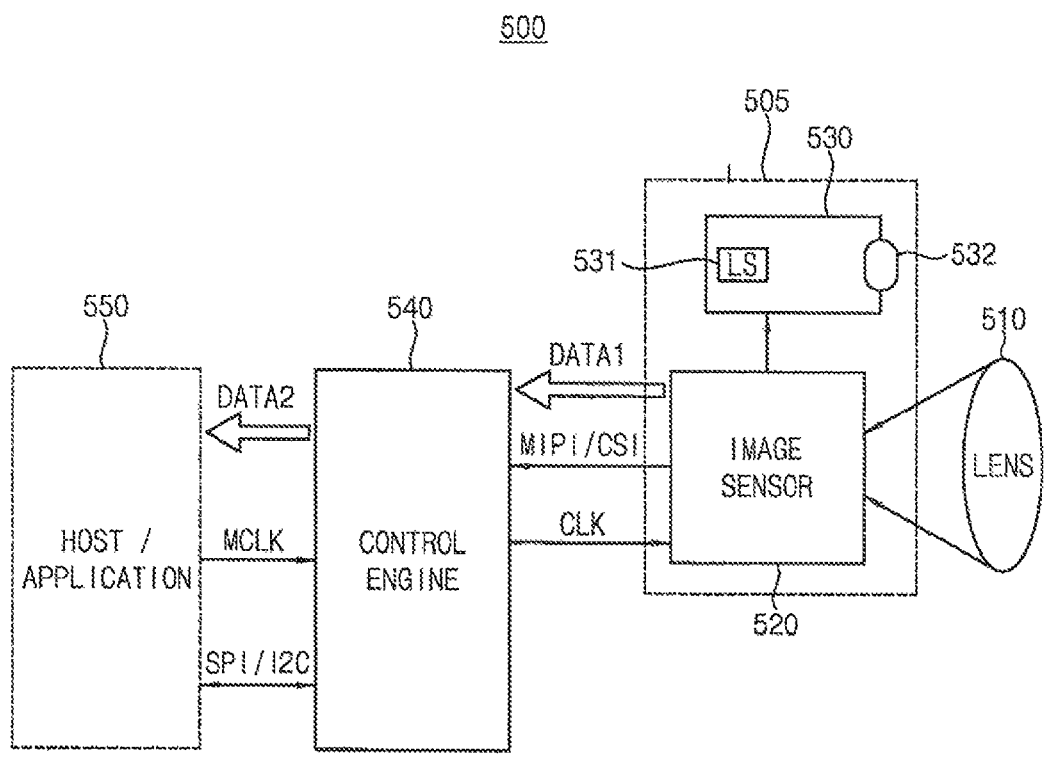
FIG. 15 is a block diagram illustrating an example of a camera including the image sensor according to some example embodiments.

FIG. 15 is a block diagram illustrating an example of a camera including the image sensor according to some example embodiments.

Referring to FIG. 15, a camera (also referred to as an image acquisition device) 500 may include a receiving lens 510, an image sensor chip 505 and a control engine 540. The image sensor chip 505 may include an image sensor 520 and a light source module 530. In some embodiments, the image sensor 520 and the light source module 530 may be implemented as separate devices, or may be implemented such that at least one component of the light source module 530 is included in the image sensor 520. The light source module 530 may include a light source 531 and a lens 532. The image sensor 520 may employ the image sensor 10 of FIG. 2 and may include a pixel array 100 and a row driver 420. The pixel array 100 may include a plurality of unit pixels 110 arranged in a matrix that includes a plurality of rows and a plurality of columns. Each of the unit pixels 110 may convert incident light to an electric signal. The row driver 420 may sequentially scan a plurality of rows of unit pixels 110. The row driver 420 may sequentially perform an electronic shutter operation to reset an electric signal stored in each of the unit pixels 110 and a read-out operation to read-out the electric signal stored in each of the unit pixels 110. The electronic shutter operation may include a preliminary shutter operation and a main shutter operation which are sequentially performed on one row. Therefore, the camera 500 may reduce shutter noise although the 1H time is decreased.

The receiving lens 510 may focus incident light on a photo-receiving region (e.g., the pixel array 100 in FIG. 2) of the image sensor 520. The image sensor chip 505 may generate data DATA1 including depth information and/or color image information based on the incident light passing through the receiving lens 510. For example, the data DATA1 generated by the image sensor 520 may include depth data generated using infrared light or near-infrared light emitted by the light source module 530, and/or red, green, blue (RGB) data of a Bayer pattern generated using external visible light. The image sensor 520 may provide the data DATA1 to the control engine 540 in response to a clock signal CLK. In some embodiments, the image sensor 520 may interface with the control engine 540 using a mobile industry processor interface (MIPI) and/or a camera serial interface (CSI).

The control engine 540 may control the image sensor chip 505. The control engine 540 may process the data DATA1 received from the image sensor 520. For example, the control engine 540 may generate color data based on the received data DATA1. In some embodiments, the control engine 540 may generate luminance, chrominance (YUV) data including a luminance component (Y), a difference between the luminance component and a blue component (U), and a difference between the luminance component and a red component (V) based on the RGB data, and/or may generate compressed data, such as Joint Photographic Experts Group (JPEG) data. The control engine 540 may be coupled to a host/application 550, and may provide data DATA2 to the host/application 550 based on a master clock signal MCLK. In some embodiments, the control engine 540 may interface with the host/application 550 using a serial peripheral interface (SPI) and/or an inter integrated circuit (I2C) interface.

Figure 16:
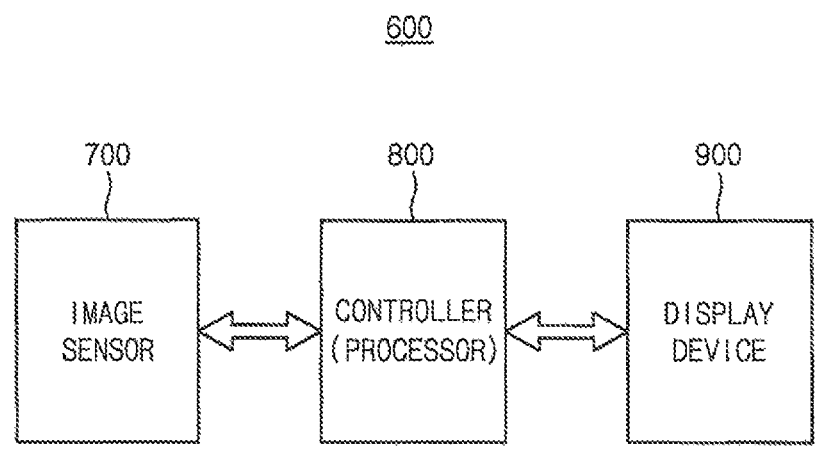
FIG. 16 is a block diagram illustrating an example of an imaging system including the image sensor according to some example embodiments.

FIG. 16 is a block diagram illustrating an example of an imaging system including the image sensor according to some example embodiments.

Referring to FIG. 16, an imaging system 600 may include an image sensor 700, a controller (or a processor) 800 and a display device 900. As illustrated in FIG. 16, the image sensor 700 may be coupled to the display device 900 via the controller 800. Therefore, the display device 900 may display images based on image signals from the image sensor 700. The image sensor 700 may employ the image sensor 10 of FIG. 2. Therefore, the image sensor 700 may reduce shutter noise although the 1H time is decreased by synchronizing the main shutter operation on a first row of the plurality of rows and the preliminary shutter operation on a second row, different from the first row, of the plurality of rows.

Figure 17:
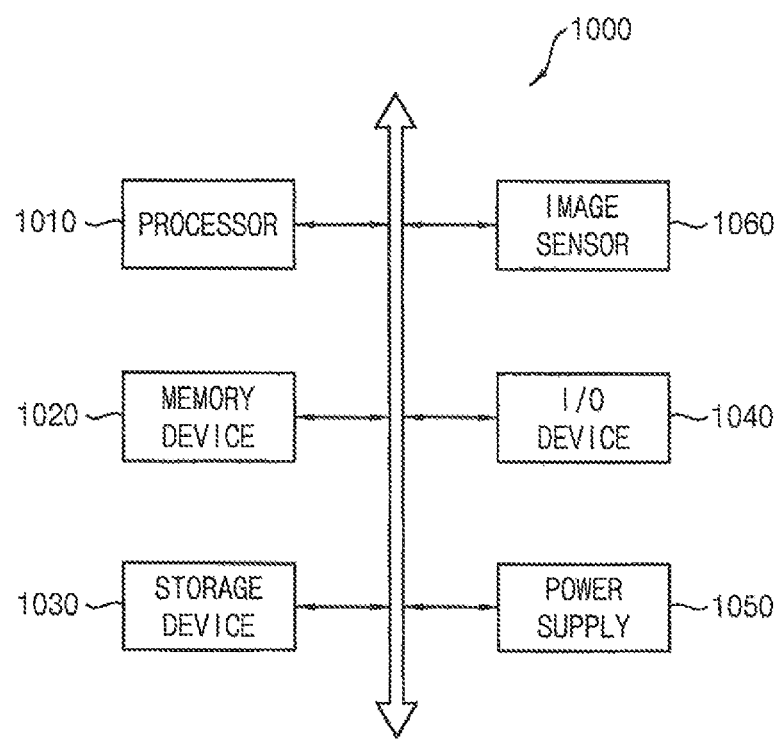
FIG. 17 is a block diagram illustrating an electronic device according to some example embodiments.
Figure 18:
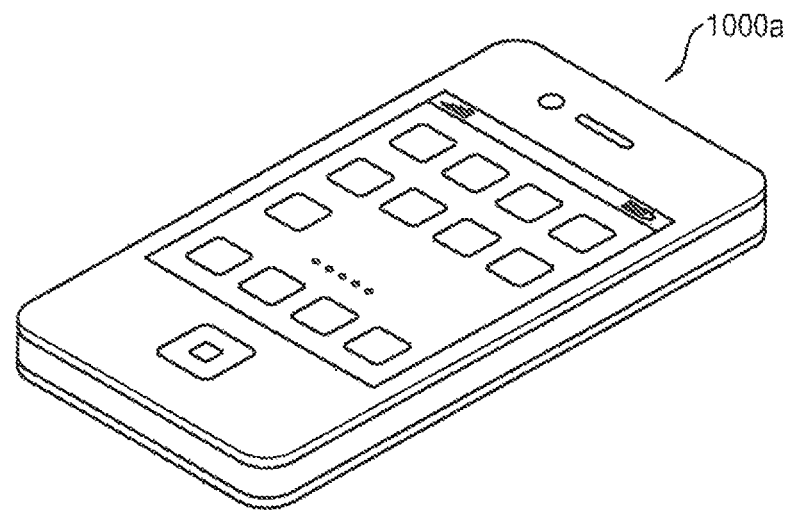
FIG. 18 is a diagram illustrating an example embodiment of an electronic device in which the electronic device of FIG. 17 is implemented.
Figure 19:
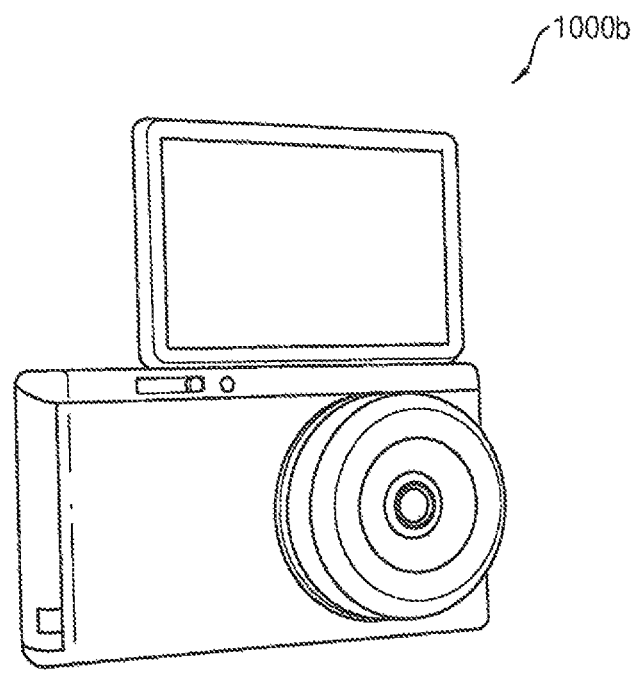
FIG. 19 is a diagram illustrating an example embodiment of an electronic device in which the electronic device of FIG. 17 is implemented.

FIG. 17 is a block diagram illustrating an electronic device according to some example embodiments, FIG. 18 is a diagram illustrating an example embodiment of an electronic device in which the electronic device of FIG. 17 is implemented, and FIG. 19 is a diagram illustrating an example embodiment of an electronic device in which the electronic device of FIG. 17 is implemented.

Referring to FIGS. 17 to 19, an electronic device 1000 may include a processor 1010, a memory device 1020, a storage device 1030, an input/output (IO) device 1040, a power supply 1050, and an image sensor 1060. In some embodiments, the electronic device 1000 may further include a plurality of ports for communicating with a video card, a sound card, a memory card, a universal serial bus (USB) device, other electronic devices, etc. In some embodiments, as illustrated in FIG. 18, the electronic device 1000 may be a smart phone 1000a. In some embodiments, as illustrated in FIG. 19, the electronic device 1000 may be digital camera 1000b. The image sensor 1060 in the electronic device 1000 may employ the image sensor 10 of FIG. 2. Therefore, the image sensor 1060 may reduce shutter noise although the 1H time is decreased by synchronizing the main shutter operation on a first row of the plurality of rows and the preliminary shutter operation on a second row, different from the first row, of the plurality of rows.

The processor 1010 may perform various computing functions. The processor 1010 may be, for example, a micro-processor, a central processing unit (CPU), an application processor (AP), etc. The processor 1010 may be coupled to the memory device 1020, the storage device 1030, and the I/O device 1040 via an address bus, a control bus, a data bus, etc. In some embodiments, the processor 1010 may be coupled to an extended bus such as a peripheral component interconnection (PCI) bus. The memory device 1020 may store data for operations of the electronic device 1000. For example, the memory device 1020 may include a volatile semiconductor memory device such as a dynamic random access memory (DRAM) device, a static random access memory (SRAM) device, a mobile DRAM, etc, and a non-volatile semiconductor memory device such as, for example, an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage device 1030 may include a solid state drive (SSD) device, a hard disk drive (HDD) device, a CD-ROM device, etc.

The I/O device 1040 may include an input device such as, for example, a keyboard, a keypad, a touchpad, a touchscreen, a mouse device, etc, and/or an output device such as a display device, a printer, a speaker, etc. The power supply 1050 may supply power to the electronic device 1000. The image sensor 1060 may be coupled to other components via the buses or other communication links.

In some embodiments, the image sensor 1060 may be implemented by various packages such as, for example, Package on Package (PoP), Ball grid arrays (BGAs), Chip scale packages (CSPs), Plastic eaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), Wafer-Level Processed Stack Package (WSP), etc.

As described above, the electronic device 1000 including the image sensor 1060 may reduce the shutter noise. In some embodiments, the image sensor 1060 and the processor 1010 may be integrated in one chip. In some embodiments, the image sensor 1060 and the processor 1010 may be integrated in different chips, respectively. Although it is illustrated in FIGS. 18 and 19 that the electronic device 1000 is the smart phone 1000a or the digital camera 1000b (e.g., a mirror-less digital camera, etc), the electronic device 1000 is not limited thereto. That is, it should be understood that the electronic device 1000 can be any electronic device including (or using) the image sensor 1060. For example, the electronic device 1000 may be implemented as a cellular phone, a smart pad, a personal digital assistants (PDA), a portable multimedia player (PMP), etc.

FIG. 20 is a block diagram illustrating an example of an interface that is used in the electronic device of FIG. 17.

Referring to FIG. 20, the electronic device 1000 may be implemented by a data processing device that uses or supports a mobile industry processor interface (MIPI) interface (e.g., a mobile phone, a personal digital assistant (PDA), a portable multimedia player (PMP), a smart phone, etc). The electronic device 1000 may include an application processor 1110, an image sensor 1140, a display device 1150, and other various input/output devices discussed in detail below. A CSI host 1112 of the application processor 1110 may perform a serial communication with a CSI device 1141 of the image sensor 1140 using a camera serial interface (CSI). In example embodiments, the CSI host 1112 may include a light deserializer (DES), and the CSI device 1141 may include a light serializer (SER). A DSI host 1111 of the application processor 110 may perform a serial communication with a DSI device 1151 of the display device 1150 using a display serial interface (DSI). In example embodiments, the DSI host 111 may include a light serializer (SER), and the DSI device 1151 may include a light deserializer (DES). The electronic device 1000 may further include a radio frequency (RF) chip 1160. The RF chip 1160 may perform a communication with the application processor 1110. A physical layer (PHY) 1113 of the portable electronic device 1000 and a physical layer (PHY) 1161 of the RF chip 1160 may perform data communications based on a MIPI DigRF. The application processor 1110 may further include a DigRF MASTER 1114 that controls the data communications of the PHY 1161. The electronic device 1000 may include a global positioning system (GPS) 1120, a storage 1170, a MIC 1180, a DRAM device 1185, and/or a speaker 1190. The portable electronic device 1000 may perform communications using an ultra wideband (UWB) 1210, a wireless local area network (WLAN) 1220, a worldwide interoperability for microwave access (WIMAX) 1130, etc. However, a structure and an interface of the electronic device 1000 are not limited thereto.

Example embodiments can be applied to various image sensor and various imaging systems. For instance, example embodiments can be applied to a mobile phone, a smart phone, a personal digital assistant (PDA), a portable multimedia player (PMP), a digital camera, a personal computer, a sever computer, a workstation, a notebook, a digital television, a set-top box, a music player, a portable game console and a navigation system.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor comprising:
a pixel array including a plurality of unit pixels that are arranged in a matrix form that includes a plurality of rows and a plurality of columns, respective ones of the unit pixels configured to convert an incident light to an electric signal and configured to store the electric signal; and
a row driver configured to sequentially scan the plurality of rows and configured to sequentially perform an electronic shutter operation and a read-out operation, the electronic shutter operation to reset the stored electric signal in each unit pixel and the read-out operation to read-out the stored electric signal in each unit pixel,
wherein the electronic shutter operation includes a preliminary shutter operation and a main shutter operation which are sequentially performed on one row, and
wherein the row driver is configured to overlap the main shutter operation on a first row of the plurality of rows and the preliminary shutter operation on a second row, different from the first row, of the plurality of rows,
wherein the plurality of unit pixels comprises first unit pixels and second unit pixels which are alternatively arranged in a column direction, and
wherein one of the first unit pixels and one of the second unit pixels commonly further comprise:
a reset transistor coupled between a power supply voltage and a floating diffusion node;
a sensing transistor coupled to the power supply voltage, the sensing transistor having a gate coupled to the floating diffusion node; and
a selection transistor coupled to the sensing transistor and a corresponding column line.

2. The image sensor of claim 1, wherein a unit time required for scanning the one row corresponds to 1 horizontal scanning (1H) time, and
wherein the preliminary shutter operation on the one row is performed within a first 1 H time, and the main shutter operation on the one row is performed within a second 1H time after the first 1H time.

3. The image sensor of claim 2,
wherein respective ones of the first unit pixels comprise:
a first photo detector configured to convert the incident light to the electric signal, the first photo detector having a first terminal coupled to a ground voltage; and
a first transfer transistor coupled to a second terminal of the first photo detector and the floating diffusion node,
wherein respective ones of the second unit pixels comprise:
a second photo detector configured to convert the incident light to the electric signal, the second photo detector having a first terminal coupled to the ground voltage; and
a second transfer transistor coupled to a second terminal of the second photo detector and the floating diffusion node.

4. The image sensor of claim 3, wherein the row driver is configured to:
apply a reset control signal to agate of the reset transistor;
apply a selection control signal to a gate of the selection transistor; and apply a first transfer control signal to a gate of the first transfer transistor and apply a second transfer control signal to a gate of the second transfer transistors respectively.

5. The image sensor of claim 4, wherein the row driver is configured to:
perform the preliminary shutter operation by applying the first transfer control signal to the first transfer transistor as a preliminary shutter pulse, the first transfer control signal being activated within a preliminary shutter interval;
perform the main shutter operation by applying the first transfer control signal to the first transfer transistor as a main shutter pulse, the first transfer control signal being activated within a main shutter interval; and
perform the read-out operation by applying the first transfer control signal to the first transfer transistor as a read-out pulse, the first transfer control signal being activated within a read-out interval.

6. The image sensor of claim 5, wherein the row driver is configured to activate the selection control signal during the read-out interval.

7. The image sensor of claim 5, wherein the second 1H time is one 1H time interval behind from the first 1H time,
wherein the row driver is configured to synchronize the main shutter operation on the first row and the preliminary shutter operation on the second row based on an address signal, and
wherein the first row and the second row have a difference by two rows in the column direction.

8. The image sensor of claim 5, wherein the second 1H time is consecutive to the first 1H time,
wherein the row driver is configured to deactivate the reset control signal commonly shared by the respective first unit pixels and the respective second unit pixels during an interval that the preliminary shutter pulse is applied and during an interval that the main shutter pulse is applied, respectively,
wherein the row driver is configured to synchronize the main shutter operation on the first row and the preliminary shutter operation on the second row based on an address signal, and
wherein the first row and the second row have a difference by one row in the column direction.

9. The image sensor of claim 1, wherein the row driver is configured to perform the electronic shutter operation on the plurality of unit pixels on a row basis, and
wherein the image sensor is a rolling-shutter image sensor.

10. The image sensor of claim 1, wherein the preliminary shutter operation performed on the first unit pixels does not overlap the preliminary shutter operation performed on the second unit pixels.

11. An image acquisition device comprising:
an image sensor having a pixel array;
a receiving lens configured to focus incident light on the pixel array; and
a control engine configured to control the image sensor, wherein the image sensor comprises:
the pixel array including a plurality of unit pixels that are arranged in a matrix form that includes a plurality of rows and a plurality of columns respective ones of the unit pixels configured to convert the incident light to an electric signal and configured to store the electric signal; and
a row driver configured to sequentially scan the plurality of rows and configured to sequentially perform an electronic shutter operation and a read-out operation, the electronic shutter operation to reset the stored electric signal in each unit pixel and the read-out operation to read-out the stored electric signal in each unit pixel,
wherein the electronic shutter operation includes a preliminary shutter operation and a main shutter operation which are sequentially performed on one row, and
wherein the row driver is configured to overlap the main shutter operation on a first row of the plurality of rows and the preliminary shutter operation on a second row, different from the first row, of the plurality of rows,
wherein the plurality of unit pixels comprises first unit pixels and second unit pixels which are alternatively arranged in a column direction, and
wherein one of the first unit pixels and one of the second unit pixels commonly further comprise:
a reset transistor coupled between a power supply voltage and a floating diffusion node;
a sensing transistor coupled to the power supply voltage, the sensing transistor having a gate coupled to the floating diffusion node; and
a selection transistor coupled to the sensing transistor and a corresponding column line.

12. The image acquisition device of claim 11, wherein a unit time required for scanning the one row corresponds to 1 horizontal scanning (1H) time,
the preliminary shutter operation on the one row is performed within a first 1H time, and the main shutter operation on the one row is performed within a second 1H time after the first 1H time.

13. The image sensor of claim 11, wherein the row driver is configured to perform the electronic shutter operation on the plurality of unit pixels on a row basis, and
wherein the image sensor is a rolling-shutter image sensor.

14. The image sensor of claim 11, wherein the preliminary shutter operation performed on the first unit pixels does not overlap the preliminary shutter operation performed on the second unit pixels.

15. An electronic device comprising:
an image sensor configured to generate a digital signal corresponding to incident light;
a storage device configured to store the digital signal; and
a processor configured to control operations of the image sensor and the storage device, wherein the image sensor comprises:
a pixel array including a plurality of unit pixels that are arranged in a matrix form that includes a plurality of rows and a plurality of columns, respective ones of the unit pixels configured to convert the incident light to an electric signal and configured to store the electric signal; and
a row driver configured to sequentially scan the plurality of rows and configured to sequentially perform an electronic shutter operation and a read-out operation, the electronic shutter operation to reset the stored electric signal in each unit pixel and the read-out operation to read-out the stored electric signal in each unit pixel,
wherein the electronic shutter operation includes a preliminary shutter operation and a main shutter operation which are sequentially performed on one row, and
wherein the row driver is configured to synchronize the main shutter operation on a first row of the plurality of rows and the preliminary shutter operation on a second row, different from the first row, of the plurality of rows, wherein the plurality of unit pixels comprises first unit pixels and second unit pixels which are alternatively arranged in a column direction, and wherein one of the first unit pixels and one of the second unit pixels commonly further comprise:

a reset transistor coupled between a power supply voltage and a floating diffusion node;

a sensing transistor coupled to the power supply voltage, the sensing transistor having a gate coupled to the floating diffusion node; and a selection transistor coupled to the sensing transistor and a corresponding column line.

16. The electronic device of claim 15, wherein a unit time required for scanning the one row corresponds to 1 horizontal scanning (1H) time, the preliminary shutter operation on the one row is performed within a first 1H time, and the main shutter operation on the one row is performed within a second 1H time after the first 1H time.

17. The electronic device of claim 16, wherein the row driver is configured to:

perform the preliminary shutter operation on the one row within the first 1H time; and perform the main shutter operation on the one row within the second 1H time, and wherein the second 1H time is consecutive to the first 1H time.

18. The electronic device of claim 16, wherein the row driver is configured to:

perform the preliminary shutter operation on the one row within the first 1H time; and perform the main shutter operation on the one row within the second 1H time, and wherein the second 1H time is one 1H time interval behind from the first time.

19. The image sensor of claim 15, wherein the row driver is configured to perform the electronic shutter operation on the plurality of unit pixels on a row basis, and wherein the image sensor is a rolling-shutter image sensor.

20. The image sensor of claim 15, wherein the preliminary shutter operation performed on the first unit pixels does not overlap the preliminary shutter operation performed on the second unit.

* * * * *